US012581297B2

(12) United States Patent
Woodworth et al.

(10) Patent No.: US 12,581,297 B2
(45) Date of Patent: Mar. 17, 2026

(54) SECURE NETWORK CONFIGURATION AND/OR ACCESS USING USER DEVICE

(71) Applicant: CenturyLink Intellectual Property LLC, Broomfield, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 226 days.

(21) Appl. No.: 18/537,162

(22) Filed: Dec. 12, 2023

(65) Prior Publication Data

US 2024/0267728 A1 Aug. 8, 2024

Related U.S. Application Data

(60) Provisional application No. 63/483,447, filed on Feb. 6, 2023.

(51) Int. Cl.
*H04W 12/06* (2021.01)
*H04L 41/0816* (2022.01)
*H04W 12/50* (2021.01)

(52) U.S. Cl.
CPC ......... *H04W 12/06* (2013.01); *H04L 41/0816* (2013.01); *H04W 12/50* (2021.01)

(58) Field of Classification Search
CPC .... H04W 12/06; H04W 12/50; H04L 41/0816
USPC .............................................................. 726/7
See application file for complete search history.

(56) References Cited

U.S. PATENT DOCUMENTS

| | | | | |
|---|---|---|---|---|
| 2006/0114894 A1* | 6/2006 | Cherchali | ........... | H04L 61/2596 709/245 |
| 2018/0077557 A1* | 3/2018 | Goto | ................ | G06K 19/06028 |
| 2020/0145826 A1* | 5/2020 | Katz | .................... | G06K 7/1417 |

FOREIGN PATENT DOCUMENTS

WO WO-2013185533 A1 * 12/2013 ............ H04W 12/04

* cited by examiner

*Primary Examiner* — Zi Ye

(57) ABSTRACT

Novel tools and techniques are provided for implementing secure network configuration and/or secure network access using a user device. In various embodiments, after establishing a secure wireless connection with a local network device, in some cases, by scanning and decoding a barcode (including connectivity data for connecting with the local network device) that is affixed to, or displayed on a display device on, a surface of the local network device, the user device may configure the local network device with settings and configurations. The user device may also provide a new wireless device with connectivity data for connecting with the local network device, in some cases, by scanning and decoding another barcode on the new wireless device to establish a secure connection to send the connectivity data. The user device and/or the new wireless device may then access a network established by the (configured) local network device.

17 Claims, 13 Drawing Sheets

100

Replacement Local Network Device Using Old Network

300A

New Local Network Device Or New Network

300B

Providing New User Device (With Camera) With Access to LAN

_325c_     <u>305</u>

_320c_

Comm.
System(s)
<u>330a</u>

User Device (1) Scan and decode barcode (2) Establish secure communications (3) Send connectivity data for connecting to
Local Network Device ("LND")

<u>335a</u>

Camera(s)
<u>315b</u>

Comm.
System(s)
<u>330d</u>

<u>310c</u>

Comm.
System(s)
<u>330e</u>

Local Network Device (4) Establish secure communications (5) Send network access settings for LAN (6) Access LAN New User Device

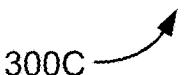

Providing New User Device (Without Camera) With Access to LAN

_305_

Camera(s)

_315a_

Comm. System(s)

_330a_

User Device

_310c_

Comm. System(s)

_330e_

Local Network Device (1) Scan and decode barcode (2) Establish secure communications (3) Send connectivity data for connecting to Local Network Device ("LND")

(4) Establish secure communications (5) Send network access settings for LAN (6) Access LAN _325d_     _335b_

_320d_

Comm. System(s)

_330f_

New User Device

Fig. 3D

Providing New User Device (With Bluetooth/NFC/RFID) With Access to LAN

Bluetooth/
NFC/RFID
_330g_

Comm.
System(s)
_330a_

_305_

User Device

Bluetooth/
NFC/RFID
_330h_

Comm.
System(s)
_330i_

_335c_

New User Device (1) Discover Devices (2) Establish secure communications (3) Send connectivity data for connecting to
Local Network Device ("LND")

Comm.
System(s)
_330e_

_310c_

Local Network Device (4) Establish secure communications (5) Send network access settings for LAN (6) Access LAN

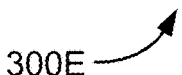

Providing New User Device (With Bluetooth/NFC/RFID) With Access to LAN

325c          305

"Temporary Password"

Comm. System(s)
330a

User Device (1) Establish secure communications with Local Network Device ("LND")

(2) Cause LND to initiate temporary access mode (3) Generate temporary password and display on screen 310c Comm. System(s)
330e Local Network Device 325e          335d "Temporary Password"

Input Device(s)
340a (4) Receive manually entered temporary password

Comm. System(s)
330j

New User Device (5) Access LAN using temporary password

300F

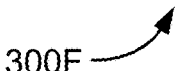

Fig. 3F

Providing New User Device With Access to LAN Using Virtual WPS Functionality

325c    *305*

WPS

345a (4) Receive user input depressing virtual WPS button to make LAN temporarily accessible (1) Establish secure communications with Local Network Device ("LND")

(2) Cause LND to initiate temporary access mode (3) Generate virtual WPS button and display on screen Comm. System(s)
*330a*

User Device

*310c*

Comm. System(s)
*330e*

Local Network Device

325f    *335e*

Connect

345b

Input Device(s)
*340b*

(5) Receive user input depressing virtual Connect button to connect

Comm. System(s)
*330k*

(6) Access LAN using virtual WPS

New User Device

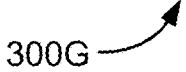

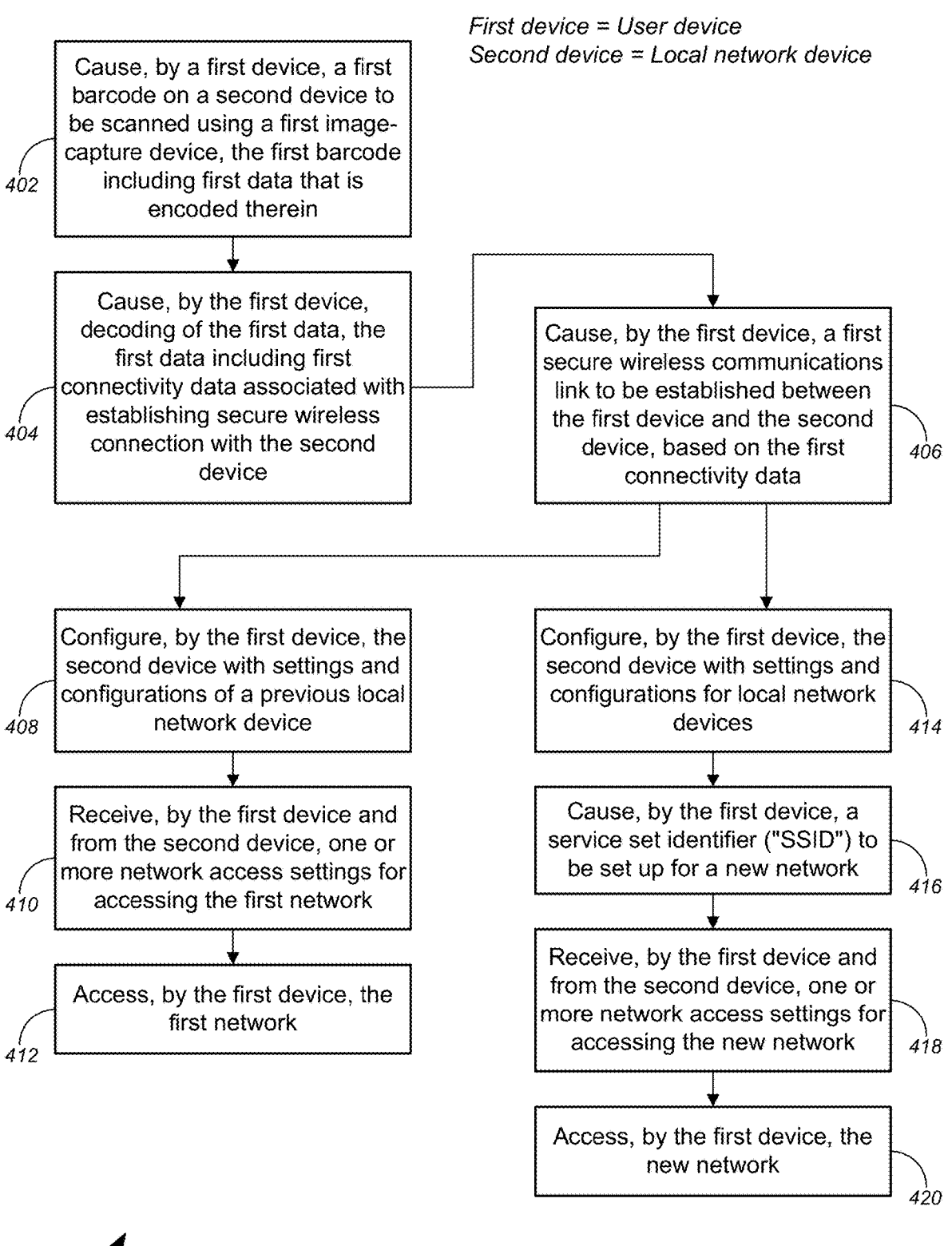

*First device = User device*
*Second device = Local network device*

Cause, by a first device, a first barcode on a second device to be scanned using a first image-capture device, the first barcode including first data that is encoded therein

402

Cause, by the first device, decoding of the first data, the first data including first connectivity data associated with establishing secure wireless connection with the second device

404

Cause, by the first device, a first secure wireless communications link to be established between the first device and the second device, based on the first connectivity data

406

Configure, by the first device, the second device with settings and configurations of a previous local network device

408

Receive, by the first device and from the second device, one or more network access settings for accessing the first network

410

Access, by the first device, the first network

412

Configure, by the first device, the second device with settings and configurations for local network devices

414

Cause, by the first device, a service set identifier ("SSID") to be set up for a new network

416

Receive, by the first device and from the second device, one or more network access settings for accessing the new network

418

Access, by the first device, the new network

*First device = Not-yet-connected device*
*Second device = Previously connected device*

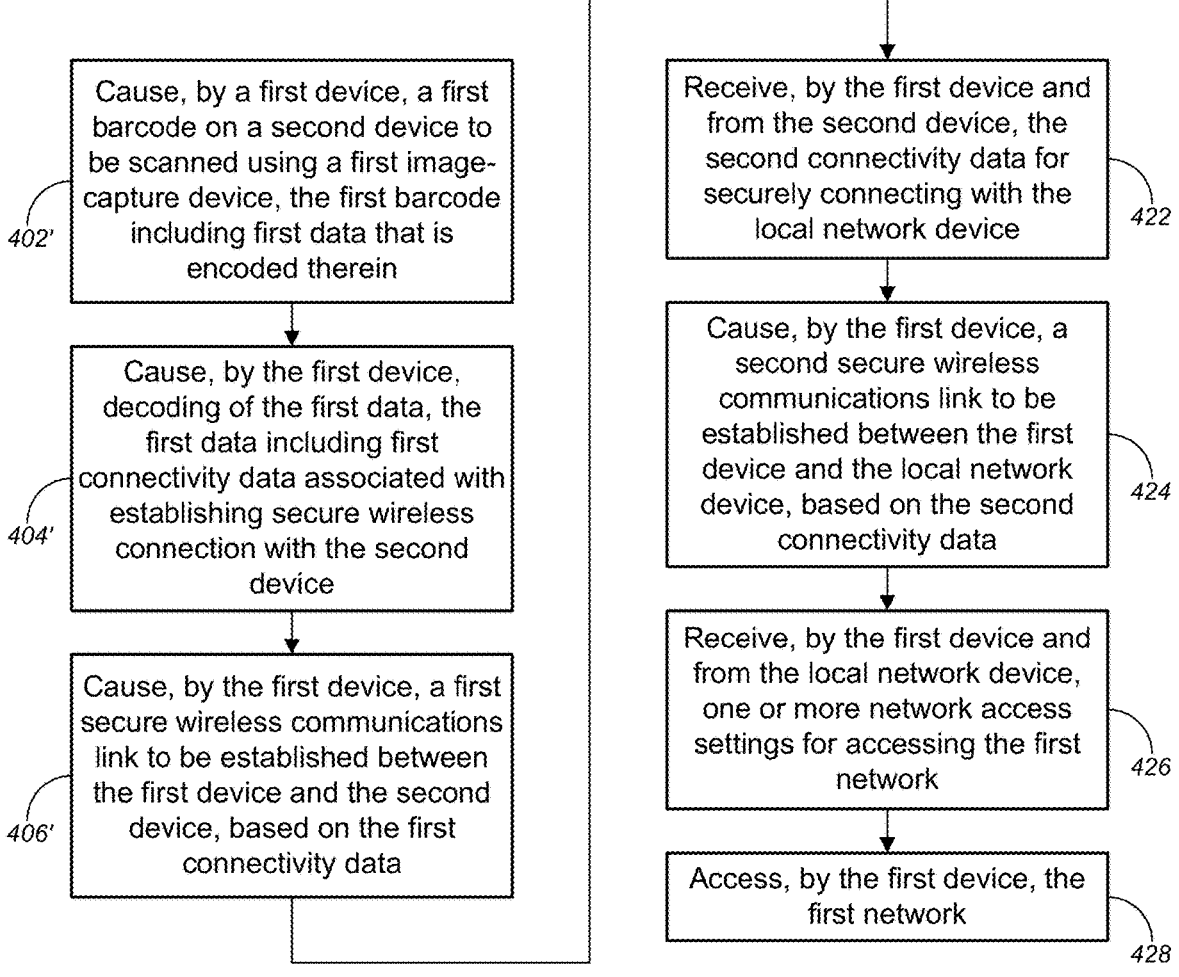

Cause, by a first device, a first barcode on a second device to be scanned using a first image-capture device, the first barcode including first data that is encoded therein

402'

Cause, by the first device, decoding of the first data, the first data including first connectivity data associated with establishing secure wireless connection with the second device

404'

Cause, by the first device, a first secure wireless communications link to be established between the first device and the second device, based on the first connectivity data

406'

Receive, by the first device and from the second device, the second connectivity data for securely connecting with the local network device

422

Cause, by the first device, a second secure wireless communications link to be established between the first device and the local network device, based on the second connectivity data

424

Receive, by the first device and from the local network device, one or more network access settings for accessing the first network

426

Access, by the first device, the first network

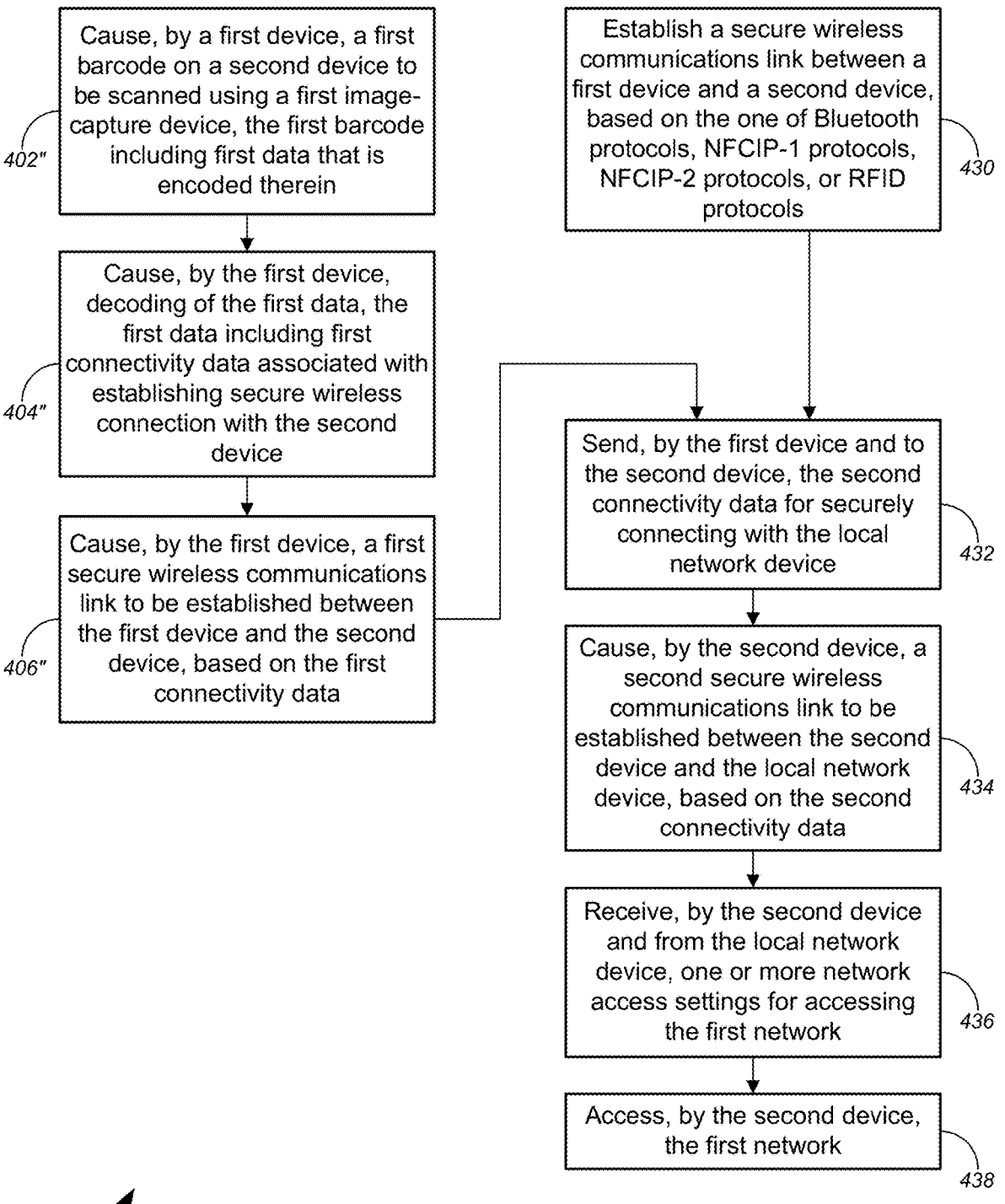

*First device = Previously connected device*
*Second device = Not-yet-connected device*

Cause, by a first device, a first barcode on a second device to be scanned using a first image-capture device, the first barcode including first data that is encoded therein

402″

Cause, by the first device, decoding of the first data, the first data including first connectivity data associated with establishing secure wireless connection with the second device

404″

Cause, by the first device, a first secure wireless communications link to be established between the first device and the second device, based on the first connectivity data

406″

Establish a secure wireless communications link between a first device and a second device, based on the one of Bluetooth protocols, NFCIP-1 protocols, NFCIP-2 protocols, or RFID protocols

430

Send, by the first device and to the second device, the second connectivity data for securely connecting with the local network device

432

Cause, by the second device, a second secure wireless communications link to be established between the second device and the local network device, based on the second connectivity data

434

Receive, by the second device and from the local network device, one or more network access settings for accessing the first network

436

Access, by the second device, the first network

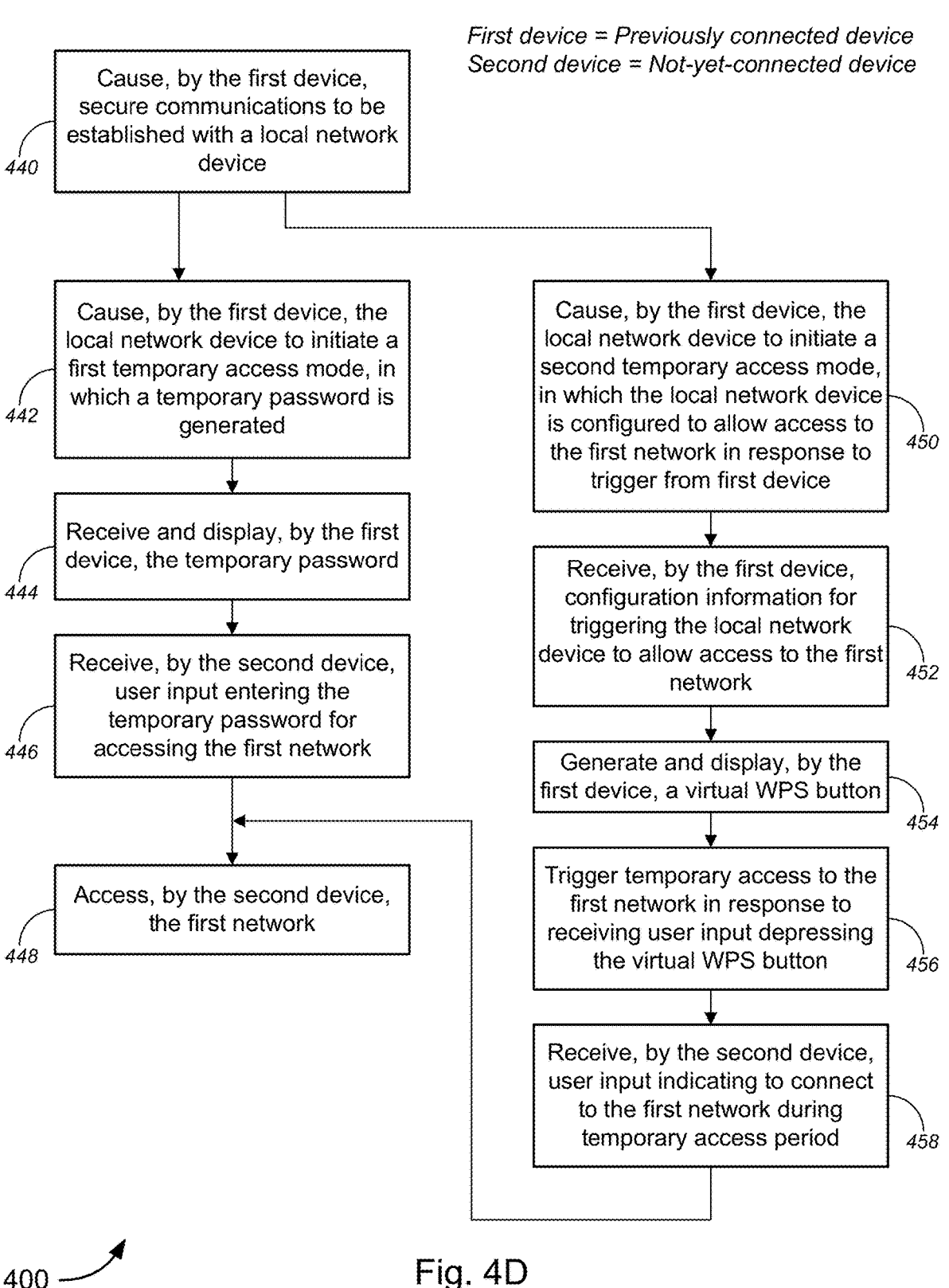

*First device = Previously connected device*
*Second device = Not-yet-connected device*

440 — Cause, by the first device, secure communications to be established with a local network device 442 — Cause, by the first device, the local network device to initiate a first temporary access mode, in which a temporary password is generated 444 — Receive and display, by the first device, the temporary password 446 — Receive, by the second device, user input entering the temporary password for accessing the first network 448 — Access, by the second device, the first network 450 — Cause, by the first device, the local network device to initiate a second temporary access mode, in which the local network device is configured to allow access to the first network in response to trigger from first device 452 — Receive, by the first device, configuration information for triggering the local network device to allow access to the first network 454 — Generate and display, by the first device, a virtual WPS button 456 — Trigger temporary access to the first network in response to receiving user input depressing the virtual WPS button 458 — Receive, by the second device, user input indicating to connect to the first network during temporary access period

SECURE NETWORK CONFIGURATION AND/OR ACCESS USING USER DEVICE

CROSS-REFERENCE TO RELATED APPLICATIONS

This application claims the benefit of U.S. Provisional Application No. 63/483,447 filed Feb. 6, 2023, entitled "Secure Network Configuration and/or Access Using User Device," which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network configuration and access, and, more particularly, to methods, systems, and apparatuses for implementing secure network configuration and/or secure network access using a user device.

BACKGROUND

Maintaining wireless network security is a complicated process, and many users (both residential users and small or medium business users) lack the knowledge to secure their (home or business) wireless networks. Events such as hardware failure also contribute to exacerbate the issue. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 $105a$-$105n$, the integer value of n in $105n$ may be the same or different from the integer value of n in $110n$ for component #2 $110a$-$110n$, and so on.

FIGS. 3A-3G are block flow diagrams illustrating various non-limiting examples of interactions between one or more user devices and a local network device during implementation of secure network configuration or secure network access using a user device, in accordance with various embodiments.

FIGS. 4A-4D are flow diagrams illustrating a method for implementing secure network configuration and/or secure network access using a user device, in accordance with various embodiments.

DETAILED DESCRIPTION OF CERTAIN EMBODIMENTS

Overview

Figure 1:
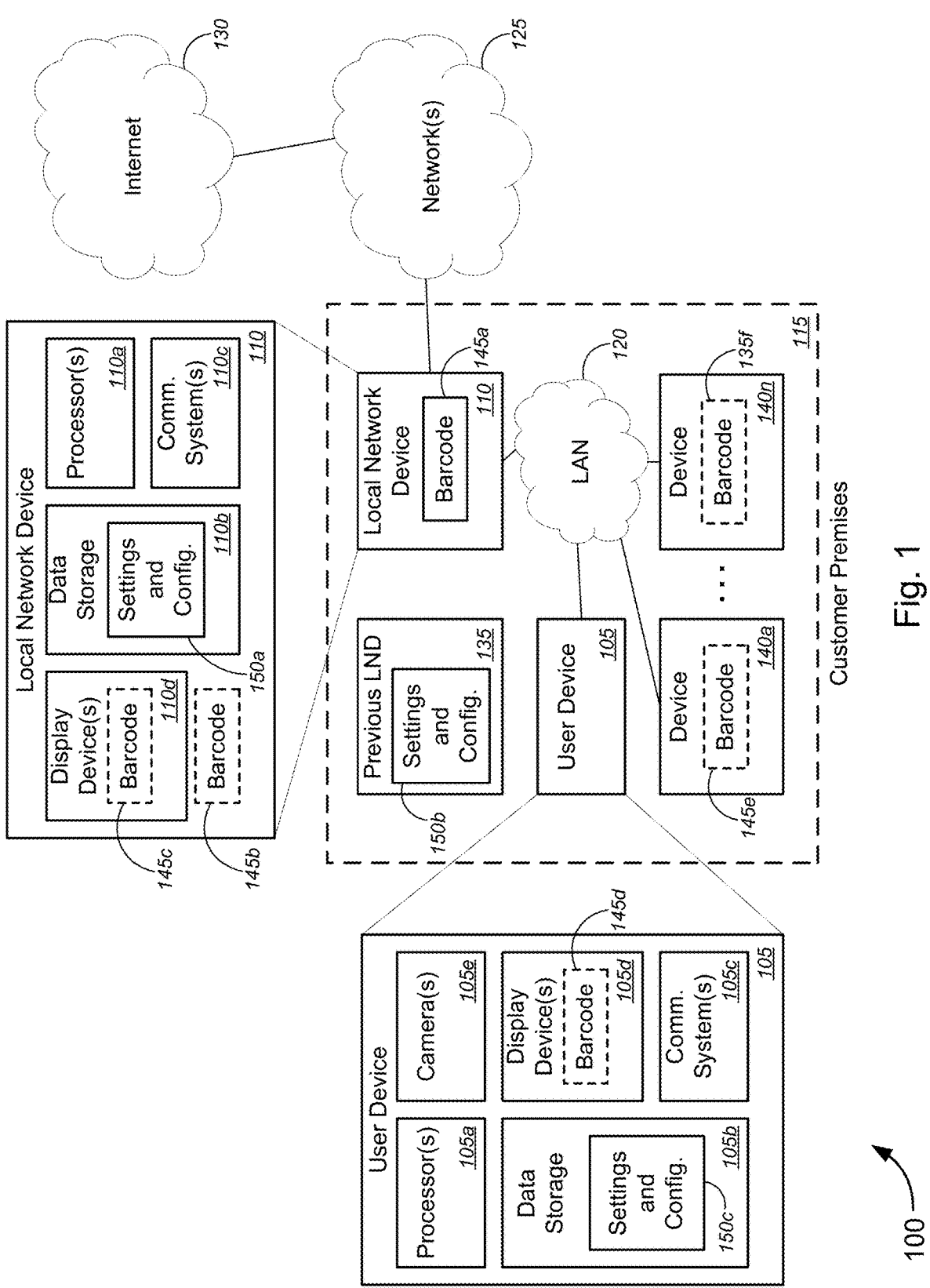
FIG. 1 is a schematic diagram illustrating a system for implementing secure network configuration and/or secure network access using a user device, in accordance with various embodiments.

Various embodiments provide tools and techniques for implementing network configuration and access, and, more particularly, to methods, systems, and apparatuses for implementing secure network configuration and/or secure network access using a user device.

In various embodiments, a user device may be used to establish a secure wireless connection with a local network device, in some cases, by scanning and decoding a barcode that is affixed to, or displayed on a display device on, a surface of the local network device, the barcode including connectivity data for connecting with the local network device. After establishing the secure wireless connection, the user device may configure the local network device with settings and configurations. The user device may also be used to provide a new wireless device with connectivity data for connecting with the local network device, in some cases, by scanning and decoding another barcode that is affixed to, or displayed on a display device on, a surface of the new wireless device to establish a secure connection to send the connectivity data. The user device and/or the new wireless device may then access a network established by the (configured) local network device.

The various embodiments create and transfer known working settings to wireless access points, home routers, and other wireless devices. In some cases, lock or disable subsequent modification of the settings and configurations of these devices, e.g., to prevent tempering or accidental modification by third parties. In this manner, wireless networks can be made more secure, while providing an easy process for configuring new or replacement local network devices and/or for connecting new wireless devices to the network.

These and other aspects of the secure network configuration and/or secure network access using a user device are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may include causing, by a first device, a first barcode on a second device to be scanned using a first image-capture device, the first barcode including first data that is encoded therein; causing, by the first device, decoding of the first data that is encoded in the first barcode, the first data including first connectivity data associated with establishing secure wireless connection with the second device; causing, by the first device, a first secure wireless communications link to be established between the first device and the second device, based on the first connectivity data that is encoded in the first barcode; exchanging, over the first secure wireless communications link between the first and second devices, second data, the second data including one of one or more network access settings for accessing a first network that is established by a local network device or second connectivity data for connecting with a third device to obtain the one or more network access settings for accessing the first network; and accessing, by one of the first device or the second device, the first network, using the one or more network access settings, or the like.

In some embodiments, the first barcode may include one of a one-dimensional ("1D") barcode or a two-dimensional ("2D") barcode, or the like. In some instances, the local network device may include, without limitation, one of a wireless access point ("WAP"), a modem, a router, a gateway device, or a device combining functionalities of two or more of the WAP, the modem, the router, or the gateway device, or the like. In some cases, the first device may include a user device, the second device may include the local network device, the first barcode may include one of a static barcode that is affixed to a surface of the local network device or a dynamic barcode that is displayed on a display device on the surface of the local network device, and the local network device may include a replacement local network device that replaces a previous local network device. In some examples, the method may further include, after the first secure wireless communications link has been established, configuring, by the first device, the second device with settings and configurations of the previous local network device. In some instances, exchanging the second data may include, after the second device has established the first network based on the settings and configurations of the previous local network device, receiving, by the first device, the one or more network access settings from the second device. In some cases, accessing the first network may include accessing, by the first device, the first network, using the one or more network access settings.

In some examples, the user device may include, but is not limited to, one of a smart phone, a mobile phone, a tablet computer, a laptop computer, a desktop computer, or a portable gaming device, or the like. In some cases, the static barcode may include a sticker-based barcode, while the dynamic barcode may include a changeable barcode that is displayed on a display device that is one of affixed to or integrated with the surface of the local network device. In some instances, the display device may include, without limitation, one of an electronic ink ("e-ink")-based display device, an electronic paper ("e-paper")-based display device, a liquid crystal display ("LCD") device, a light-emitting diode ("LED") display device, or an organic LED ("OLED") display device, or the like. In some cases, the second device may be configured to have a media access control ("MAC") address that is a clone of a MAC address of the previous local network device. In some examples, the method may further include, after configuring the second device with settings and configurations of the previous local network device, causing, by the first device, the second device to lock or disable subsequent modification of its settings and configurations.

Alternatively, the first device may include a user device, while the second device may include the local network device, and the first barcode may include, but is not limited to, one of a static barcode that is affixed to a surface of the local network device or a dynamic barcode that is displayed on a display device on the surface of the local network device. In some examples, the method may further include, after the first secure wireless communications link has been established, configuring, by the first device, the second device with settings and configurations for local network devices; and causing, by the first device, a service set identifier ("SSID") to be set up for a new network, the new network being the first network. In some cases, exchanging the second data may include, after the second device has established the first network based on the settings and configurations for local network devices and with the SSID that is caused to be set up by the first device, receiving, by the first device, the one or more network access settings from the second device. In some instances, accessing the first network may include accessing, by the first device, the first network, using the one or more network access settings.

Alternatively, the first device may include a not-yet-connected user device, while the second device may include a previously connected user device, and the first barcode may be a barcode that is displayed on a display device of the second device. In some examples, the method may further include, after the first secure wireless communications link has been established, performing the step of exchanging the second data, which may include receiving, by the first device and from the second device, the second connectivity data for securely connecting with the local network device, the local network device being the third device; causing, by the first device, a second secure wireless communications link to be established between the first device and the local network device, based on the second connectivity data that is received from the second device; and after the second secure wireless communications link has been established, receiving, by the first device, the one or more network access settings from the local network device. In some cases, accessing the first network may include accessing, by the first device, the first network, using the one or more network access settings. In some instances, the first device may include, but is not limited to, one of a smart phone, a mobile phone, a tablet computer, a laptop computer, a desktop computer, a portable gaming device, or other user device with which the first image-capture device is at least one of an integrated or externally communicatively coupled, or the like.

Alternatively, the first device may include a previously connected user device, while the second device may include a not-yet-connected user device, and the first barcode may include one of a static barcode that is affixed to a surface of the second device or a dynamic barcode that is displayed on a display device on the surface of the second device. In some examples, the method may further include, after the first secure wireless communications link has been established, performing the step of exchanging the second data, which may include sending, by the first device and to the second device, the second connectivity data for securely connecting with the local network device, the local network device being the third device; causing, by the second device, a second secure wireless communications link to be established between the second device and the local network device, based on the second connectivity data that is received from the first device; and after the second secure wireless communications link has been established, receiving, by the second device, the one or more network access settings from the local network device. In some cases, accessing the first network may include accessing, by the second device, the first network, using the one or more network access settings. In some instances, the second device may include, without limitation, one of a smart phone, a mobile phone, a tablet computer, a laptop computer, a desktop computer, a portable gaming device, a home appliance, an office machine, a medical device, a commercial device, or an industrial device, or the like. In some cases, establishing one or both of the first secure wireless communications link or the second secure wireless communications link may be performed based on a determined highest wireless encryption scheme that each device that is linked by the corresponding secure wireless communications link is capable of utilizing.

According to some embodiments, at least one of the first connectivity data or the second connectivity data may include, without limitation, at least one of a shared secret key, a network password, or a network passphrase, and/or the like. In some instances, the one or more network access settings may include, but are not limited to, at least one of a private Internet Protocol ("IP") subnet address, a gateway ID, a service set identifier ("SSID") for the first network, a media access control ("MAC") address for the local network device, or domain name system ("DNS") settings, and/or the like.

In another aspect, a user device may include a first image-capture device; at least one first processor; and a first non-transitory computer readable medium communicatively coupled to the at least one first processor. The first non-transitory computer readable medium may have stored thereon computer software including a first set of instructions that, when executed by the at least one first processor, causes the user device to: scan a first barcode on a second device using the first image-capture device, the first barcode including first data that is encoded therein; decode the first data that is encoded in the first barcode, the first data including first connectivity data associated with establishing secure wireless connection with the second device; establish a first secure wireless communications link between the user device and the second device, based on the first connectivity data that is encoded in the first barcode; and exchange, over the first secure wireless communications link, second data, the second data including one of one or more network access settings for accessing a first network that is established by a local network device or second connectivity data for connecting with a third device to obtain the one or more network access settings for accessing the first network. The first network may be accessed by one of the user device or the second device using the one or more network access settings.

In some embodiments, the second device may include the local network device, while the first barcode may be one of a static barcode that is affixed to a surface of the local network device or a dynamic barcode that is displayed on a display device on the surface of the local network device. In some examples, the first set of instructions, when executed by the at least one first processor, may further cause the user device to perform one of: (a) in response to receiving user input to utilize settings and configurations of a previous local network device, performing the following: after the first secure wireless communications link has been established, configuring the second device with settings and configurations of the previous local network device; wherein exchanging the second data includes, after the second device has established the first network based on the settings and configurations of the previous local network device, receiving the one or more network access settings from the second device; and wherein accessing the first network includes accessing the first network, using the one or more network access settings; or (b) in response to receiving user input to set up a new network, performing the following: after the first secure wireless communications link has been established, configuring the second device with settings and configurations for local network devices; setting up a service set identifier ("SSID") for a new network, the new network being the first network; wherein exchanging the second data includes, after the second device has established the first network based on the settings and configurations for local network devices and with the SSID that is caused to be set up by the first device, receiving the one or more network access settings from the second device; and wherein accessing the first network includes accessing the first network, using the one or more network access settings.

According to some embodiments, the third device may include the local network device. In some examples, the first set of instructions, when executed by the at least one first processor, may further cause the user device to perform one of: (1) in response to receiving user input to provide access to the first network to the second device, which is a not-yet-connected device that does not have a camera but the first barcode is one of a static barcode that is affixed to a surface of the second device or a dynamic barcode that is displayed on a display device on the surface of the second devices, performing the following: after the first secure wireless communications link has been established, performing the step of exchanging the second data, wherein exchanging the second data includes sending, to the second device, the second connectivity data for securely connecting with the local network device, wherein the second device accesses the first network using the one or more network access settings that it receives from the local network device after establishing the second secure wireless communications link between the second device and the local network device, based on the second connectivity data that is received from the user device; (2) in response to receiving user input to provide access to the first network to a fourth device, which is a not-yet-connected device that has a camera, performing the following: generating a second barcode on a display device for the fourth device to scan, the second barcode including third data that is encoded therein, the third data including third connectivity data associated with establishing secure wireless connection with the user device; after a third secure wireless communications link has been established between the user device and the fourth device based on the third connectivity data that is encoded in the second barcode, sending, to the fourth device, fourth connectivity data for securely connecting with the local network device, wherein the fourth device accesses the first network using one or more second network access settings that it receives from the local network device after establishing a fourth secure wireless communications link between the fourth device and the local network device, based on the fourth connectivity data that is received from the user device; (3) in response to receiving user input to provide access to the first network to a fifth device, which is a not-yet-connected device that is capable of communicating using a secure wireless communications link based on one of IEEE 802.15 protocols ("Bluetooth protocols"), ISO/IEC 18092 protocols ("NFCIP-1 protocols"), ISO/IEC 21281 protocols ("NFCIP-2 protocols"), or ISO/IEC 14443 protocols ("RFID protocols"), or the like, performing the following: establishing a fifth secure wireless communications link between the user device and the fifth device, based on the one of the Bluetooth protocols, the NFCIP-1 protocols, the NFCIP-2 protocols, or the RFID protocols, or the like; after the fifth secure wireless communications link has been established between the user device and the fifth device, sending, to the fifth device, fifth connectivity data for securely connecting with the local network device, wherein the fifth device accesses the first network using one or more third network access settings that it receives from the local network device after establishing a sixth secure wireless communications link between the fifth device and the local network device, based on the fifth connectivity data that is received from the user device; or (4) in response to receiving user input to provide access to the first network to a sixth device, which is a not-yet-connected device that is capable of communicating using a secure wireless communications link based on IEEE 802.11 protocols ("Wi-Fi protocols"), performing one of the following: (4)(a) causing the local network device to initiate a first temporary access mode, which includes the local network device sending a temporary password to the user device; receiving and displaying the temporary password on a display device of the user device, wherein the sixth device accesses the first network using the temporary password that is displayed on the display device of the user device; or (4)(b) causing the local network device to initiate a second temporary access mode, which includes the local network device to enter into a discovery mode that ends either after connection with a responding device or after a preset delay period; wherein the sixth device accesses the first network by connecting with the local network device by initiating its own discovery mode during the discovery mode of the local network device.

In yet another aspect, a method may include causing, by one of a first device or a second device, a secure wireless communications link to be established between the first device and the second device; exchanging, over the first secure wireless communications link between the first and second devices, network data, the network data including one of one or more network access settings for accessing a first network that is established by a local network device or first connectivity data for connecting with a third device to obtain the one or more network access settings for accessing the first network; and accessing, by one of the first device or the second device, the first network, using the one or more network access settings.

In some embodiments, the method may further include (A) setting up the local network device as a replacement local network device with settings and configurations of a previous local network device, wherein the first device includes a user device, and the second device includes the local network device. In some examples, setting up the local network device as the replacement local network device may include: the user device scanning and decoding a barcode that is one of a static barcode that is affixed to a surface of the local network device or a dynamic barcode that is displayed on a display device on the surface of the local network device, the barcode including second connectivity data associated with establishing secure wireless connection with the local network device; and the user device configuring the local network device with settings and configurations of the previous local network device, after secure wireless communications link has been established based on the second connectivity data.

Alternatively, the method may further include (B) setting up a new network, wherein the first device includes the user device, wherein the second device includes the local network device. In some examples, setting up the new network may include: the user device scanning and decoding a barcode that is one of a static barcode that is affixed to a surface of the local network device or a dynamic barcode that is displayed on a display device on the surface of the local network device, the barcode including the second connectivity data associated with establishing secure wireless connection with the local network device; and the user device configuring the local network device with settings and configurations of local network devices and setting up a service set identifier ("SSID") for a new network, after secure wireless communications link has been established based on the second connectivity data, the new network being the first network.

Alternatively, the method may further include (C) connecting a first not-yet-connected device to the first network, the first not-yet-connected device having a camera, wherein the first device includes the first not-yet-connected user device, wherein the second device includes a previously connected user device, and the third device includes the local network device. In some examples, connecting the first not-yet-connected device to the first network may include: the first not-yet-connected device scanning and decoding a barcode that is displayed on a display device of the previously connected user device, the barcode including third connectivity data associated with establishing secure wireless connection with the previously connected user device; and the first not-yet-connected device receiving, from the previously connected user device, the first connectivity data associated with establishing secure wireless connection with the local network device, after secure wireless communications link has been established based on the third connectivity data; the first not-yet-connected device receiving the one or more network access settings from the local network device, after secure wireless communications link has been established based on the first connectivity data.

Alternatively, the method may further include (D) connecting a second not-yet-connected device to the first network, the second not-yet-connected device not having a camera but having a barcode that is one of a static barcode that is affixed to a surface of the second not-yet-connected device or a dynamic barcode that is displayed on a display device on the surface of the second not-yet-connected device, wherein the first device includes the second not-yet-connected user device, while the second device includes the previously connected user device, and the third device includes the local network device. In some examples, connecting the second not-yet-connected device to the first network may include: the previously connected user device scanning and decoding that barcode that is one of a static barcode that is affixed to a surface of the second not-yet-connected device or a dynamic barcode that is displayed on a display device on the surface of the second not-yet-connected device, the barcode including fourth connectivity data associated with establishing secure wireless connection with the second not-yet-connected device; and the second not-yet-connected device receiving, from the previously connected user device, the first connectivity data associated with establishing secure wireless connection with the local network device, after secure wireless communications link has been established based on the fourth connectivity data; the second not-yet-connected device receiving the one or more network access settings from the local network device, after secure wireless communications link has been established based on the first connectivity data.

Alternatively, the method may further include (E) connecting a third not-yet-connected device to the first network, the third not-yet-connected device being capable of communicating using a secure wireless communications link based on one of IEEE 802.15 protocols ("Bluetooth protocols"), ISO/IEC 18092 protocols ("NFCIP-1 protocols"), ISO/IEC 21281 protocols ("NFCIP-2 protocols"), or ISO/IEC 14443 protocols ("RFID protocols"), and/or the like, wherein the first device includes the third not-yet-connected user device, while the second device includes the previously connected user device, and the third device includes the local network device. In some examples, connecting the third not-yet-connected device to the first network may include: the previously connected user device establishing a secure wireless communications link between the previously connected user device and the third not-yet-connected device, based on the one of the Bluetooth protocols, the NFCIP-1 protocols, the NFCIP-2 protocols, or the RFID protocols; the third not-yet-connected device receiving, from the previously connected user device, the first connectivity data associated with establishing secure wireless connection with the local network device, after secure wireless communications link has been established based on the one of the Bluetooth protocols, the NFCIP-1 protocols, the NFCIP-2 protocols, or the RFID protocols; the third not-yet-connected device receiving the one or more network access settings from the local network device, after secure wireless communications link has been established based on the first connectivity data.

Alternatively, the method may further include (F) connecting a fourth not-yet-connected device to the first network, the fourth not-yet-connected device being capable of communicating using a secure wireless communications link based on IEEE 802.11 protocols ("Wi-Fi protocols"), wherein the first device includes the fourth not-yet-connected user device, while the second device includes the previously connected user device, and the third device includes the local network device. In some examples, connecting the fourth not-yet-connected device to the first network may include: the previously connected user device causing the local network device to initiate a first temporary access mode, which triggers the local network device sending a temporary password to the user device; the previously connected user device receiving and displaying the temporary password on a display device of the previously connected user device; and the fourth not-yet-connected device receiving the one or more network access settings after secure wireless communications link has been established using the temporary password that is displayed on the display device of the user device.

Alternatively, the method may further include (G) connecting a fifth not-yet-connected device to the first network, the fifth not-yet-connected device being capable of communicating using a secure wireless communications link based on Wi-Fi protocols, wherein the first device includes the fifth not-yet-connected user device, while the second device includes the previously connected user device, and the third device includes the local network device. In some examples, connecting the fourth not-yet-connected device to the first network may include: the previously connected user device causing the local network device to initiate a second temporary access mode, which triggers the local network device to enter into a first discovery mode that ends either after connection with a responding device or after a preset delay period; the fifth not-yet-connected device entering into a second discovery mode that also ends after connection with a responding device or after a preset delay period; the fifth not-yet-connected device receiving the one or more network access settings after secure wireless communications link has been established when connection is made during a period of overlap between the first discovery mode and the second discovery mode.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing network configuration and access, and, more particularly, to methods, systems, and apparatuses for implementing secure network configuration and/or secure network access using a user device, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing secure network configuration and/or secure network access using a user device, in accordance with various embodiments.

In the non-limiting embodiment of FIG. 1, system 100 may include a user device 105 (also referred to herein as "previously connected device" or the like) and a local network device 110. User device 105 and local network device 110 may be located within customer premises 115. Local network device 110 may be used to establish a local area network ("LAN") 115 and to establish connection between LAN 115 and networks external to the customer premises 115 including network(s) 125 and Internet 130, or the like. In some embodiments, system 100 may further include previous local network device ("LND") 135 and/or one or more devices 140a-140n (collectively, "devices 140" or "user devices 140" or the like), each of which may be located within customer premises 115. In some cases, customer premises 115 may include, but is not limited to, one of a residential customer premises, a business customer premises, a corporate customer premises, an enterprise customer premises, an education facility customer premises, a medical facility customer premises, or a governmental customer premises, and/or the like.

In some examples, user device 105 may include, without limitation, at least one of a processor(s) 105a, a data storage device(s) 105b, a communications system(s) 105c, a display device(s) 105d, or a camera(s) 105e, and/or the like. In some instances, user device 105 may include, but is not limited to, one of a smart phone, a mobile phone, a tablet computer, a laptop computer, a desktop computer, or a portable gaming device, or the like. In some cases, local network device 110 may include, without limitation, at least one of a processor(s) 110a, a data storage device(s) 110b, a communications system(s) 110c, or a display device(s) 145c, and/or the like. In some instances, although not shown in FIG. 1, local network device 110 may similarly include, without limitation, at least one of a processor(s), a data storage device(s), a communications system(s), or a display device(s), and/or the like. In some examples, local network device 110 and local network device 135 may each include, but is not limited to, one of a wireless access point ("WAP"), a modem, a router, a gateway device, or a device combining functionalities of two or more of the WAP, the modem, the router, or the gateway device, or the like. According to some embodiments, device 140a-140n may each include, without limitation, one of a smart phone, a mobile phone, a tablet computer, a laptop computer, a desktop computer, a portable gaming device, a home appliance (e.g., washer, dryer, refrigerator, freezer, oven, dish washer, water heater, furnace, thermostat, residential lighting system, home security system, etc.), an office machine (e.g., printer, scanner, projector, office server, office lighting system, office security system, etc.), a medical device (e.g., health monitoring system(s), etc.), a commercial device (e.g., television, audio system, media player, etc.), or an industrial device (e.g., industrial machine(s), etc.), or the like Although networks 120 and 130 have been described above as being a LAN and the Internet, respectively, the various embodiments are not so limited, and networks 120 and 130, along with network(s) 125 may be any suitable network. For example, in some embodiments, network(s) 120, 125, and/or 130 may each include, without limitation, one of a LAN, including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 120, 125, and/or 130 may include an access network of the service provider (e.g., an Internet service provider ("ISP")). In another embodiment, the network(s) 120, 125, and/or 130 may include a core network of the service provider and/or the Internet.

In operation, a first device (e.g., user device 105, or the like) may scan a first barcode (e.g., barcode 145a-145c, 145e, or 145f, or the like) on a second device (e.g., local network device 110 or previous local network device 135, or device 140 among devices 140a-140n, or the like) using a first image-capture device (e.g., camera(s) 105e, or the like), the first barcode including first data that is encoded therein. The first device may decode the first data that is encoded in the first barcode, the first data including first connectivity data associated with establishing secure wireless connection with the second device. The first device may establish a first secure wireless communications link between the first device and the second device, based on the first connectivity data that is encoded in the first barcode. The first device may exchange, over the first secure wireless communications link, second data, the second data including one of one or more network access settings for accessing a first network (e.g., LAN 120, or the like) that is established by a local network device (e.g., local network device 110, or the like) or second connectivity data for connecting with a third device (e.g., local network device 110, or the like) to obtain the one or more network access settings for accessing the first network. The first network may be accessed by one of the first device or the second device (in the case that neither the first device nor the second device are the local network device 110) using the one or more network access settings.

Figure 2A:
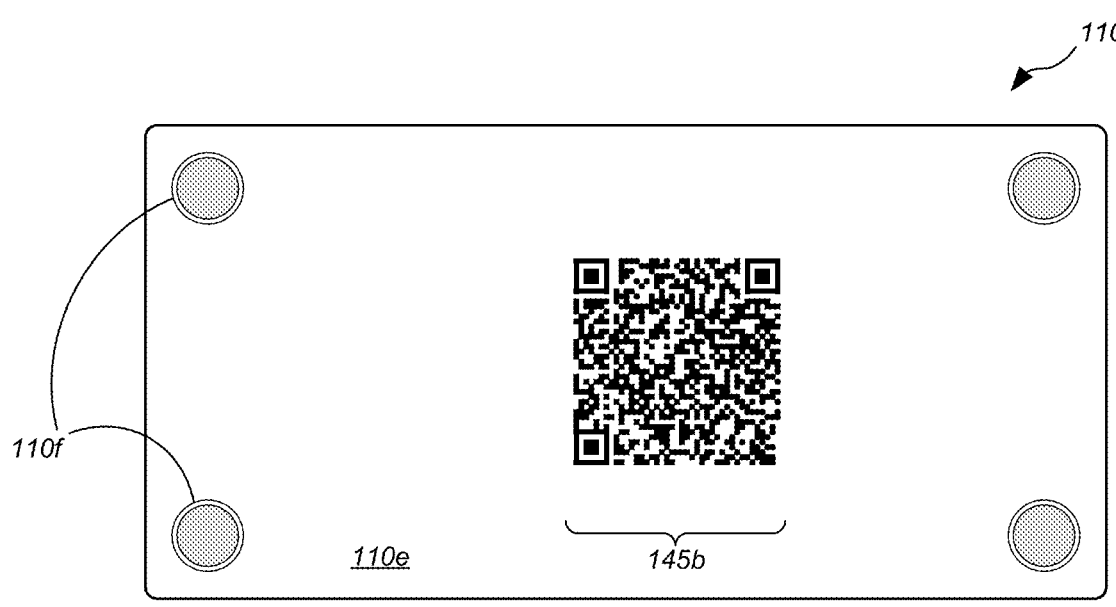
FIGS. 2A and 2B are schematic diagrams illustrating various non-limiting examples of a barcode, including a static barcode that is affixed to a surface of a local network device or a dynamic barcode that is displayed on a display device on the surface of the local network device, that may be used during implementation of secure network configuration and/or secure network access using a user device, in accordance with various embodiments.
Figure 2B:
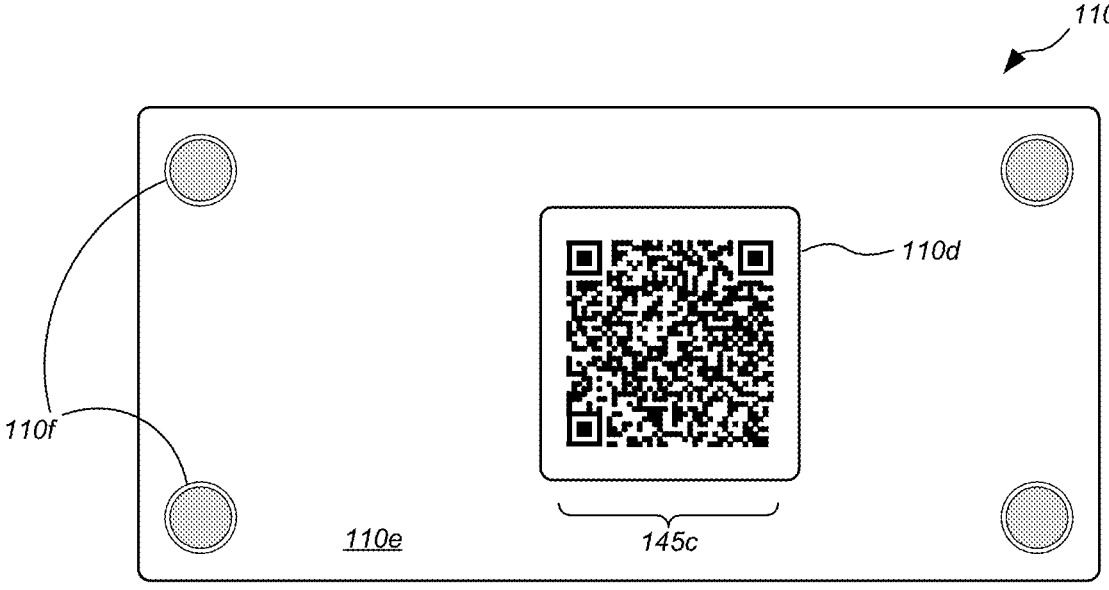

In some embodiments, in the case that the second device is the local network device 110, the first barcode 145a may be one of a static barcode 145b that is affixed to a surface of the local network device 110 or a dynamic barcode 145c that is displayed on a display device 110d on the surface of the local network device 110 (as shown, e.g., in FIGS. 2A and 2B, respectively). In some examples, the first device may perform the following. In response to receiving user input to utilize settings and configurations of a previous local network device (e.g., previous local network device 135, or the like), the first device may, after the first secure wireless communications link has been established, configure the second device with settings and configurations of the previous local network device (i.e., configure settings and configurations 150a of local network device 110 with settings and configurations 150b of the previous local network device 135, the settings and configurations 150a subsequently being stored in data storage device(s) 110b of local network device 110, a copy of which (e.g., settings and configuration 150c) being subsequently stored in data storage 105b of user device 105, or the like). In some examples, exchanging the second data may include the first device receiving the one or more network access settings from the second device, after the second device has established the first network based on the settings and configurations of the previous local network device. In some cases, accessing the first network may include the first device accessing the first network, using the one or more network access settings for the first network.

Alternatively, the first device may perform the following. In response to receiving user input to set up a new network, the first device may, after the first secure wireless communications link has been established, configure the second device with settings and configurations for local network devices. In some cases, settings and configurations 150a may subsequently be stored in data storage device(s) 110b of local network device 110, a copy of which (e.g., settings and configuration 150c) may also subsequently be stored in data storage 105b of user device 105, or the like. The first device may set up a service set identifier ("SSID," which is a set of characters that unique names a network) for a new network (in this case, LAN 120, or the like), the new network being the first network described above. In some cases, exchanging the second data may include the first device, after the second device has established the first network based on the settings and configurations for local network devices and with the SSID that is caused to be set up by the first device, receiving the one or more network access settings from the second device. In some instances, accessing the first network may include the first accessing the first network, using the one or more network access settings for the new network.

In some embodiments, whether replacing a previous local network device or setting up a new network, after configuring the local network device (either with settings and configurations of the previous local network device or with settings and configurations of local network devices in general), the first device may cause the local network device to lock or disable subsequent modification of its settings and configurations, to prevent any tempering by third parties or the like. To make any subsequent modification of its settings and configurations (e.g., account configurations, user interface configurations, etc.) after a local network device has already been configured, the local network device must be factory-reset, which would be noticeable by the user or owner of the (residential or business) wireless network.

According to some embodiments, the second device may include device 140 among devices 140a-140n that is a not-yet-connected device that does not have a camera, but the first barcode (e.g., barcode 145e or 145f) is one of a static barcode that is affixed to a surface of the second device or a dynamic barcode that is displayed on a display device on the surface of the second devices. The third device may include the local network device 110. In some examples, the first device may, in response to receiving user input to provide access to the first network to the second device and after the first secure wireless communications link has been established, perform the step of exchanging the second data. In this case, exchanging the second data may include the first device sending, to the second device, the second connectivity data for securely connecting with the local network device. The second device may access the first network using the one or more network access settings that it receives from the local network device after establishing the second secure wireless communications link between the second device and the local network device, based on the second connectivity data that is received from the first device.

Alternatively, the second device may include device 140 among devices 140a-140n that is a not-yet-connected device that has a camera (not shown in FIG. 1), while the third device may include the local network device 110. In some examples, the first device may, in response to receiving user input to provide access to the first network to the second device, generate a second barcode (e.g., barcode 145d) on a display device (display device 105d) for the second device to scan, the second barcode including third data that is encoded therein, the third data including third connectivity data associated with establishing secure wireless connection with the first device. After a third secure wireless communications link has been established between the first device and the second device based on the third connectivity data that is encoded in the second barcode, the first device may send, to the second device, fourth connectivity data for securely connecting with the local network device. In some cases, the second device may access the first network using one or more second network access settings that it receives from the local network device after establishing a fourth secure wireless communications link between the second device and the local network device, based on the fourth connectivity data that is received from the first device.

Alternatively, the second device may include device 140 among devices 140a-140n that is a not-yet-connected device that is capable of communicating using a secure wireless communications link based on one of IEEE 802.15 protocols ("Bluetooth protocols"), ISO/IEC 18092 protocols ("NFCIP-1 protocols"), ISO/IEC 21281 protocols ("NFCIP-2 protocols"), or ISO/IEC 14443 protocols ("RFID protocols"), or the like (not shown in FIG. 1). The third device may include the local network device 110. In some examples, the first device may, in response to receiving user input to provide access to the first network to the second device, may establish a fifth secure wireless communications link between the first device and the second device, based on the one of the Bluetooth protocols, the NFCIP-1 protocols, the NFCIP-2 protocols, or the RFID protocols, or the like. After the fifth secure wireless communications link has been established between the first device and the second device, the first device may send, to the second device, fifth connectivity data for securely connecting with the local network device. The second device may access the first network using one or more third network access settings that it receives from the local network device after establishing a sixth secure wireless communications link between the second device and the local network device, based on the fifth connectivity data that is received from the first device.

Alternatively, the second device may include device 140 among devices 140a-140n that is a not-yet-connected device that is capable of communicating using a secure wireless communications link based on IEEE 802.11 protocols ("Wi-Fi protocols") (not shown in FIG. 1). The third device may include the local network device 110. In some examples, the first device may, in response to receiving user input to provide access to the first network to a sixth device, cause the local network device to initiate a first temporary access mode, which may include the local network device sending a temporary password to the first device. The first device may receive and display the temporary password on a display device (e.g., display device(s) 105d, or the like) of the first device. The second device may access the first network using the temporary password that is displayed on the display device of the first device. Alternatively, the first device may, in response to receiving user input to provide access to the first network to a sixth device, cause the local network device to initiate a second temporary access mode, which may include the local network device entering into a discovery mode (e.g., a Wi-Fi protected setup ("WPS") or similar mode, or the like) that ends either after connection with a responding device or after a preset delay period (e.g., 10, 15, 20, or 30 s, or 1, 2, 3, 4, or 5 minutes, or a range between 10 s and 5 minutes, or the like). The second device may access the first network by connecting with the local network device by initiating its own discovery mode during the discovery mode of the local network device.

In some embodiments, the first barcode may include one of a one-dimensional ("1D") barcode (including, but not limited to, a linear barcode, or the like) or a two-dimensional ("2D") barcode (including, but not limited to, a QR code, or the like), or the like. In some examples, the connectivity data (e.g., one or more of the first through fifth connectivity data) may include a shared key for encryption, a network password, or a network passphrase, or the like. In some instances, the one or more network access settings may include, but are not limited to, at least one of a private Internet Protocol ("IP") subnet address, a gateway ID, a service set identifier ("SSID") for the first network, a media access control ("MAC") address for the local network device, or domain name system ("DNS") settings, and/or the like. These and other functions of the system 100 (and its components) are described in greater detail below with respect to FIGS. 2-4.

FIGS. 2A and 2B (collectively, "FIG. 2") are schematic diagrams illustrating various non-limiting examples 200 and 200' of a barcode, including a static barcode that is affixed to a surface of a local network device (FIG. 2A) or a dynamic barcode that is displayed on a display device on the surface of the local network device (FIG. 2B), that may be used during implementation of secure network configuration and/or secure network access using a user device, in accordance with various embodiments.

In the non-limiting example 200 of FIG. 2A, a bottom view of local network device 110 is provided, where a static barcode 145b (e.g., a sticker-based barcode, or the like) is shown affixed to a bottom surface 110e of local network device 110. In some cases, the bottom surface 110e may include a plurality of feet 110f, or the like.

In the non-limiting example 200' of FIG. 2B, a bottom view of local network device 110 is provided, where a dynamic barcode 145c (e.g., a displayed barcode, or the like) is shown displayed on a display device 110d that is either integrated in or affixed to a bottom surface 110e of local network device 110. In some cases, similar to the example in FIG. 2A, the bottom surface 110e may include a plurality of feet 110f, or the like. In some instances, the display device may include, without limitation, one of an electronic ink ("e-ink")-based display device, an electronic paper ("e-paper")-based display device, a liquid crystal display ("LCD") device, a light-emitting diode ("LED") display device, or an organic LED ("OLED") display device, or the like. Because it is displayable on the display device, barcode 145c may be changed for each attempt at setting up local network device 110 (e.g., may be a barcode with a one-time encryption key, or the like), for example, to improve security of the network, or the like.

Although the barcode is shown to be either affixed on or displayed on a display device that is on a bottom surface of the local network device, the various embodiments are not so limited, and the barcode may be either affixed on or displayed on a display device that is on another surface (e.g., top surface, front surface, back surface, or side surface, etc.) of the local network device. Although not shown, previous local network device 135 would be similar to local network device 110 in terms of barcode placement and/or display. These and other functions of the examples 200 and 200' (and their components) are described in greater detail herein with respect to FIGS. 1, 3, and 4.

FIGS. 3A-3G (collectively, "FIG. 3") are block flow diagrams illustrating various non-limiting examples 300A, 300B, 300C, 300D, 300E, 300F, and 300G of interactions between one or more user devices and a local network device during implementation of secure network configuration or secure network access using a user device, in accordance with various embodiments.

Figure 3A:
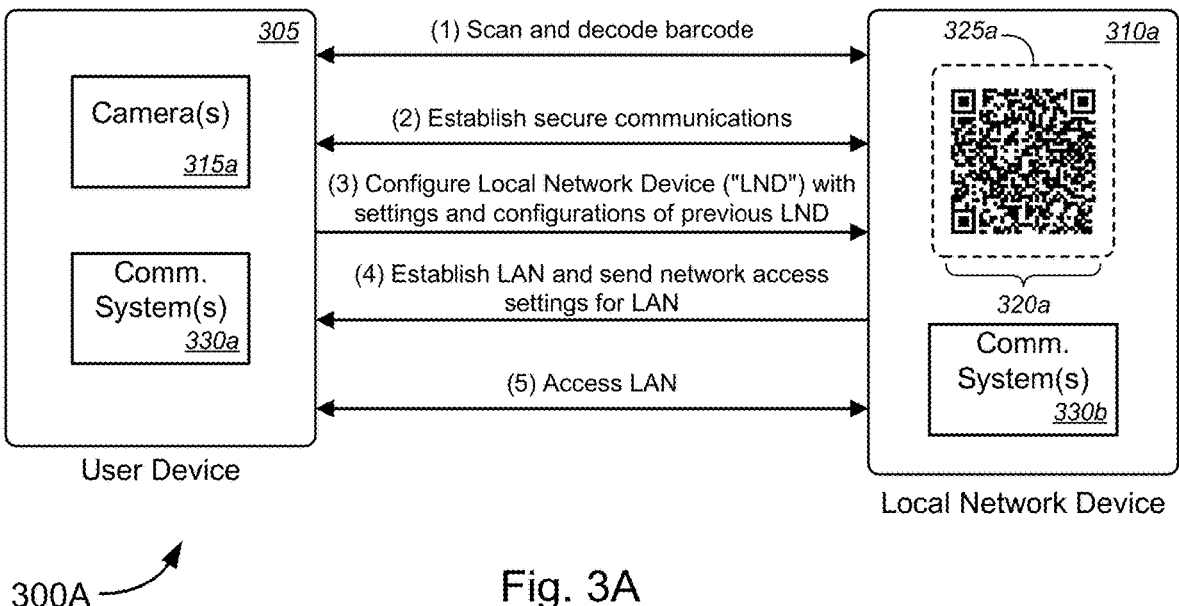

In the non-limiting example 300A of FIG. 3A, setting up a local network device 310a (similar to local network device 110 of FIG. 1 or 2, or the like) as a replacement local network device with settings and configurations of a previous local network device (similar to previous local network device 135 of FIG. 1, or the like) and/or using an existing network may include the following process. First, a user device 305 (similar to user device 105 of FIG. 1, or the like) may scan (e.g., using camera(s) 315a, which is similar to camera(s) 105e of FIG. 1, or the like) and decode (e.g., using processor(s) 105a of FIG. 1, or the like) a barcode 320a that is one of a static barcode that is affixed to a surface of the local network device (as shown, e.g., in FIG. 2A, or the like) or a dynamic barcode that is displayed on a display device (e.g., display device 325a, similar to display device 110d of FIG. 1, or the like) on the surface of the local network device (as shown, e.g., in FIG. 2B, or the like), the barcode 320a including second connectivity data associated with establishing secure wireless connection with the local network device. Second, the user device 305 may establish secure communications between the user device 305 and the local network device 310a (e.g., using communications system(s) 330a of user device 305 (similar to communications system(s) 105c of FIG. 1, or the like) and communications system(s) 330b of local network device 310a (similar to communications system(s) 110c of FIG. 1, or the like)), based on the second connectivity data. Third, the user device 305 may configure the local network device 310a with settings and configurations of the previous local network device (which settings and configurations may be stored in a data storage device of the user device 305, similar to settings and configurations 150c being stored in data storage device 105b of FIG. 1, or the like), after the secure wireless communications link has been established based on the second connectivity data. In some examples, configuring the local network device 310a may include the user device 305 pushing the settings and configurations onto the local network device 310a. In some cases, the local network device 310a may be configured to have a media access control ("MAC") address that is a clone of a MAC address of the previous local network device. Fourth, the local network device 310a may establish a first network (e.g., a LAN, or the like; similar to network or LAN 120 of FIG. 1, or the like) and may send one or more network access settings for the first network to the user device 305. Fifth, the user device 305 may access the first network using the one or more network access settings.

Figure 3B:
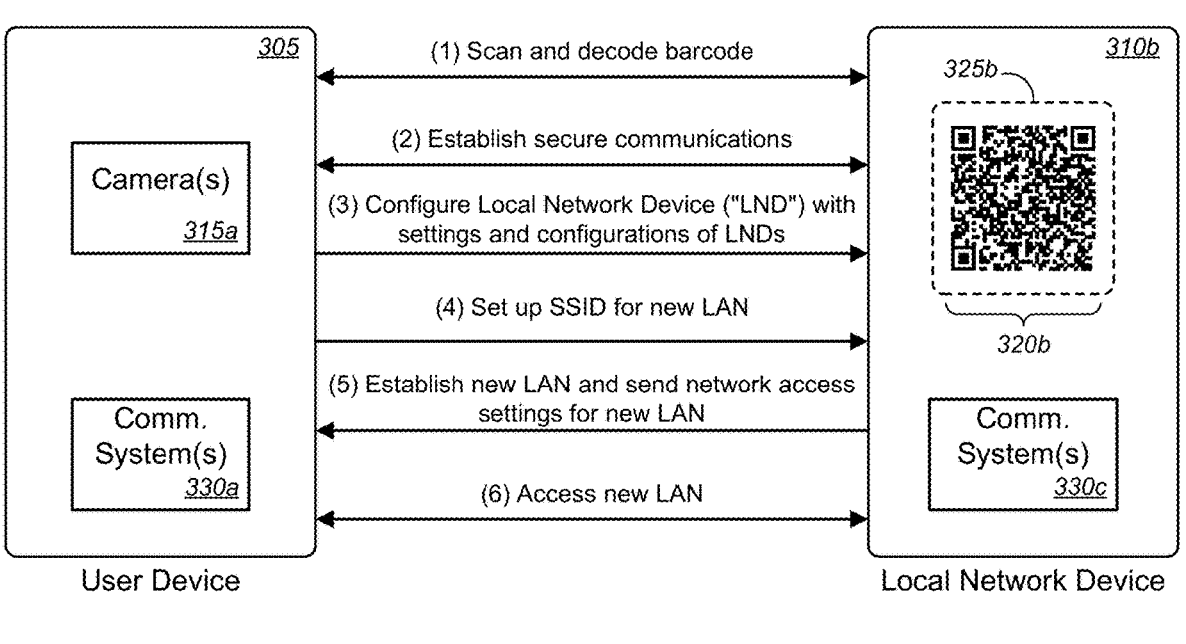

In the non-limiting example 300B of FIG. 3B, setting up a new network may include the following process. First, a user device 305 (similar to user device 105 of FIG. 1, or the like) may scan (e.g., using camera(s) 315a, which is similar to camera(s) 105e of FIG. 1, or the like) and decode (e.g., using processor(s) 105a of FIG. 1, or the like) a barcode 320b that is one of a static barcode that is affixed to a surface of a local network device 310b (similar to local network device 110 of FIG. 1 or 2, or the like) (as shown, e.g., in FIG. 2A, or the like) or a dynamic barcode that is displayed on a display device (e.g., display device 325b, similar to display device 110d of FIG. 1, or the like) on the surface of the local network device 310b (as shown, e.g., in FIG. 2B, or the like), the barcode including second connectivity data associated with establishing secure wireless connection with the local network device. Second, the user device 305 may establish secure communications between the user device 305 and the local network device 310b (e.g., using communications system(s) 330a of user device 305 (similar to communications system(s) 105c of FIG. 1, or the like) and communications system(s) 330c of local network device 310b (similar to communications system(s) 110c of FIG. 1, or the like)), based on the second connectivity data. Third, the user device 305 may configure the local network device 310b with settings and configurations of local network devices, after secure wireless communications link has been established based on the second connectivity data. In some examples, configuring the local network device 310*b* may include the user device 305 pushing the settings and configurations onto the local network device 310*b*. Fourth, the user device 305 may set up a service set identifier ("SSID") for a new network (e.g., a LAN, or the like; similar to network or LAN 120 of FIG. 1, or the like). Fifth, the local network device 310*b* may establish the new network and may send one or more network access settings for the new network to the user device 305. Sixth, the user device 305 may access the new network using the one or more network access settings.

In the non-limiting example 300C of FIG. 3C, connecting a new user device 335*a* (similar to one of devices 140*a*-140*n* of FIG. 1, or the like), which is a first not-yet-connected device that has a camera, to a first network may include the following process. First, the new user device 335*a* may scan and decode a barcode 320*c* (similar to barcode 145*d* of FIG. 1, or the like) that is displayed on a display device 325*c* (similar to display device 105*d* of FIG. 1, or the like) of a previously connected user device (e.g., user device 305, which is similar to user device 105 of FIG. 1, or the like), the barcode including third connectivity data associated with establishing secure wireless connection with the previously connected user device. Second, the new user device 335*a* may establish secure communications between the new user device 335*a* and the user device 305 (e.g., using communications system(s) 330*a* of user device 305 (similar to communications system(s) 105*c* of FIG. 1, or the like) and communications system(s) 330*d* of the new user device 335*a*), based on the third connectivity data. Third, the user device 305 may send, and the new user device 335*a* may receive, the first connectivity data associated with establishing secure wireless connection with a local network device 310*c* (similar to local network device 110 of FIG. 1, or the like), after the secure wireless communications link has been established based on the third connectivity data. Fourth, the new user device 335*a* may establish secure communications between the new user device 335*a* and the local network device 310*c* (e.g., using communications system(s) 330*e* of local network device 310*c* (similar to communications system(s) 110*c* of FIG. 1, or the like) and communications system(s) 330*d* of the new user device 335*a*), based on the first connectivity data. Fifth, the local network device 310*c* may send, and the new user device 335*a* may receive, one or more network access settings for accessing a first network (e.g., a LAN, or the like; similar to network or LAN 120 of FIG. 1, or the like), after secure wireless communications link has been established based on the first connectivity data. Sixth, the new user device 335*a* may access the first network using the one or more network access settings.

In the non-limiting example 300D of FIG. 3D, connecting new user device 335*b* (similar to one of devices 140*a*-140*n* of FIG. 1, or the like), which is a second not-yet-connected device that does not have a camera but has a barcode 320*d* (similar to barcode 145*e* or 145*f* of FIG. 1, or the like) that is one of a static barcode that is affixed to a surface of the new user device 335*b* or a dynamic barcode that is displayed on a display device (e.g., display device 325*d*, or the like) on the surface of the new user device 335*b*, to the first network may include the following process. First, a previously connected user device (e.g., a user device 305, which is similar to user device 105 of FIG. 1, or the like) may scan (e.g., using camera(s) 315*a*, which is similar to camera(s) 105*e* of FIG. 1, or the like) and decode (e.g., using processor(s) 105*a* of FIG. 1, or the like) the barcode 320*d*, the barcode 320*d* including fourth connectivity data associated with establishing secure wireless connection with the new user device 335*b*. Second, the user device 305 may establish secure communications between the user device 305 and the new user device 335*b* (e.g., using communications system(s) 330*a* of user device 305 (similar to communications system(s) 105*c* of FIG. 1, or the like) and communications system(s) 330*f* of the new user device 335*b*), based on the fourth connectivity data. Third, the user device 305 may send, and the new user device 335*b* may receive, first connectivity data associated with establishing secure wireless connection with local network device 310*c* (similar to local network device 110 of FIG. 1, or the like), after secure wireless communications link has been established based on the fourth connectivity data. Fourth, the new user device 335*b* may establish secure communications between the new user device 335*b* and the local network device 310*c* (e.g., using communications system(s) 330*e* of local network device 310*c* (similar to communications system(s) 110*c* of FIG. 1, or the like) and communications system(s) 330*f* of the new user device 335*b*), based on the first connectivity data. Fifth, the local network device 310*c* may send, and the new user device 335*b* may receive, one or more network access settings for accessing a first network (e.g., a LAN, or the like; similar to network or LAN 120 of FIG. 1, or the like), after secure wireless communications link has been established based on the first connectivity data. Sixth, the new user device 335*b* may access the first network using the one or more network access settings.

In the non-limiting example 300E of FIG. 3E, connecting new user device 335*c* (similar to one of devices 140*a*-140*n* of FIG. 1, or the like), which is a third not-yet-connected device that is capable of communicating using a secure wireless communications link based on one of IEEE 802.15 protocols ("Bluetooth protocols"), ISO/IEC 18092 protocols ("NFCIP-1 protocols"), ISO/IEC 21281 protocols ("NFCIP-2 protocols"), or ISO/IEC 14443 protocols ("RFID protocols"), and/or the like, to the first network may include the following process. First, each of a previously connected user device (e.g., a user device 305, which is similar to user device 105 of FIG. 1, or the like) and the new user device 335*c* may enter into a discovery mode to discover other devices based on the one of the Bluetooth protocols, the NFCIP-1 protocols, the NFCIP-2 protocols, or the RFID protocols. Second, the user device 305 and the new user device 335*c* may establish secure communications between each other (e.g., using communications system(s) 330*g* of user device 305 (similar to communications system(s) 105*c* of FIG. 1, or the like) and communications system(s) 330*h* of the new user device 335*c*), based on the one of the Bluetooth protocols, the NFCIP-1 protocols, the NFCIP-2 protocols, or the RFID protocols. Third, the user device 305 may send, and the new user device 335*c* may receive, first connectivity data associated with establishing secure wireless connection with local network device 310*c* (similar to local network device 110 of FIG. 1, or the like), after secure wireless communications link has been established based on the one of the Bluetooth protocols, the NFCIP-1 protocols, the NFCIP-2 protocols, or the RFID protocols. Fourth, the new user device 335*c* may establish secure communications between the new user device 335*c* and the local network device 310*c* (e.g., using communications system(s) 330*e* of local network device 310*c* (similar to communications system(s) 110*c* of FIG. 1, or the like) and communications system(s) 330*i* of the new user device 335*c*), based on the first connectivity data. Fifth, the local network device 310*c* may send, and the new user device 335*c* may receive, one or more network access settings for accessing a first network (e.g., a LAN, or the like; similar to network or LAN 120 of FIG. 1, or the like), after secure wireless communications link has been established based on the first connectivity data. Sixth, the new user device 335c may access the first network using the one or more network access settings.

In the non-limiting example 300F of FIG. 3F, connecting new user device 335d (similar to one of devices 140a-140n of FIG. 1, or the like), which is a fourth not-yet-connected device that is capable of communicating using a secure wireless communications link based on IEEE 802.11 protocols ("Wi-Fi protocols"), to a first network (e.g., a LAN, or the like; similar to network or LAN 120 of FIG. 1, or the like) may include the following process. First, a previously connected user device (e.g., a user device 305, which is similar to user device 105 of FIG. 1, or the like) may establish secure communications with a local network device 310c (similar to local network device 110 of FIG. 1, or the like), e.g., by acting as a proxy to prompt a connection initiation on behalf of a less intelligent system (in this case, new user device 335d). Second, the user device 305 may cause the local network device 310c to initiate a first temporary access mode. Third, as part of the first temporary access mode, the local network device 310c may generate and send a temporary password (associated with accessing the first network) to the user device 305, which may display the temporary password on display device 325c (similar to display device 105d of FIG. 1, or the like) of the user device 305. Fourth, the new user device 335d may receive user input including a manually entered password corresponding to the displayed temporary password (e.g., using input device(s) 340a of new user device 335d, or the like), and, in some cases, may display the manually entered password on display device 325e of new user device 335d. Fifth, the new user device 335d may send the manually entered password to the local network device 310c, and, in the case that the manually entered password matches the temporary password, the new user device 335d may access the first network, after secure wireless communications link has been established using the temporary password (in some cases, after the new user device 335d has received and used one or more network access settings).

In the non-limiting example 300G of FIG. 3G, connecting new user device 335e (similar to one of devices 140a-140n of FIG. 1, or the like), which is a fifth not-yet-connected device that (like the fourth not-yet-connected device) is capable of communicating using a secure wireless communications link based on Wi-Fi protocols, to a first network (e.g., a LAN, or the like; similar to network or LAN 120 of FIG. 1, or the like) may include the following process. First, a previously connected user device (e.g., a user device 305, which is similar to user device 105 of FIG. 1, or the like) may establish secure communications with a local network device 310c (similar to local network device 110 of FIG. 1, or the like), e.g., by acting as a proxy to prompt a connection initiation on behalf of a less intelligent system (in this case, new user device 335e). Second, the user device 305 may cause the local network device 310c to initiate a second temporary access mode. Third, as part of the second temporary access mode, the local network device 310c may enter into a first discovery mode (e.g., a Wi-Fi protected setup ("WPS") or similar mode, or the like) that ends either after connection with a responding device or after a preset delay period (e.g., 10, 15, 20, or 30 s, or 1, 2, 3, 4, or 5 minutes, or a range between 10 s and 5 minutes, or the like), and, in some cases, may send, to the user device 305, configuration information for triggering the local network device 310c to allow access to the first network, where, upon receiving said configuration information, the user device 305 may generate and display a virtual WPS button 345a on display device 325c. Fourth, the user device 305 may receive user input depressing the virtual WPS button 345a, thereby triggering a temporary access period in the local network device 310c. The new user device 335e may similarly enter into a second discovery mode that detects the user device 305 that is in the first discovery mode, and may provide a virtual connect button 345b (or other actuation trigger) for connecting with user device 305. Fifth, the new user device 335e may receive user input depressing the virtual connect button 345b (or user input otherwise actuating the trigger) thereby initiating connection between user device 305 and new user device 335e during the temporary access period (i.e., the period triggered by the virtual WPS button being depressed, or the like). Sixth, the new user device 335e may access the first network, after connection has been established between user device 305 and new user device 335e (in some cases, after the new user device 335e has received and used one or more network access settings).

These and other functions of the examples 300A, 300B, 300C, 300D, 300E, 300F, and 300G (and their components) are described in greater detail herein with respect to FIGS. 1, 2, and 4.

FIGS. 4A-4D (collectively, "FIG. 4") are flow diagrams illustrating a method for implementing secure network configuration and/or secure network access using a user device, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 300A, 300B, 300C, 300D, 300E, 300F, and 300G of FIGS. 1, 2A, 2B, 3A, 3B, 3C, 3D, 3E, 3F, and 3G, respectively (or components thereof), such methods may also be implemented using any suitable hardware (or software) implementation. Similarly, while each of the systems, examples, or embodiments 100, 200, 200', 300A, 300B, 300C, 300D, 300E, 300F, and 300G of FIGS. 1, 2A, 2B, 3A, 3B, 3C, 3D, 3E, 3F, and 3G, respectively (or components thereof), can operate according to the method 400 illustrated by FIG. 4 (e.g., by executing instructions embodied on a computer readable medium), the systems, examples, or embodiments 100, 200, 200', 300A, 300B, 300C, 300D, 300E, 300F, and 300G of FIGS. 1, 2A, 2B, 3A, 3B, 3C, 3D, 3E, 3F, and 3G can each also operate according to other modes of operation and/or perform other suitable procedures.

In the non-limiting embodiment of FIG. 4A, the first device may refer to a user device (e.g., user device 105 or 305 of FIG. 1 or 3, or the like), while the second device may refer to a local network device (e.g., local network device 110, 310a, 310b, or 310c of FIG. 1 or 3, or the like). Method 400, at block 402, may include causing, by the first device, a first barcode on the second device to be scanned using a first image-capture device, the first barcode including first data that is encoded therein. At block 404, method 400 may include causing, by the first device, decoding of the first data that is encoded in the first barcode, the first data including first connectivity data associated with establishing secure wireless connection with the second device. Method 400 may further include causing, by the first device, a first secure wireless communications link to be established between the first device and the second device, based on the first connectivity data that is encoded in the first barcode (block 406). Method 400 either may continue onto the process at block 408 or may continue onto the process at block 414.

In some embodiments, the first barcode may include one of a one-dimensional ("1D") barcode or a two-dimensional ("2D") barcode, or the like. In some instances, the local network device may include, without limitation, one of a wireless access point ("WAP"), a modem, a router, a gateway device, or a device combining functionalities of two or more of the WAP, the modem, the router, or the gateway device, or the like. In some cases, the first device may include a user device, the second device may include the local network device, and the first barcode may include one of a static barcode that is affixed to a surface of the local network device or a dynamic barcode that is displayed on a display device on the surface of the local network device. In some instances, the static barcode may include a sticker-based barcode, while the dynamic barcode may include a changeable barcode that is displayed on the display device that is one of affixed to or integrated with the surface of the local network device. In some instances, the display device may include, without limitation, one of an electronic ink ("e-ink")-based display device, an electronic paper ("e-paper")-based display device, a liquid crystal display ("LCD") device, a light-emitting diode ("LED") display device, or an organic LED ("OLED") display device, or the like. In some examples, the user device may include, but is not limited to, one of a smart phone, a mobile phone, a tablet computer, a laptop computer, a desktop computer, or a portable gaming device, or the like At block 408, method 400 may include, after the first secure wireless communications link has been established, configuring, by the first device, the second device with settings and configurations of a previous local network device. Method 400 may further include receiving, by the first device and from the second device, one or more network access settings for accessing a first network (block 410); and accessing, by the first device, the first network, using the one or more network access settings (block 412). In some cases, the second device may be configured to have a media access control ("MAC") address that is a clone of a MAC address of the previous local network device.

Alternatively, at block 414, method 400 may include, after the first secure wireless communications link has been established, configuring, by the first device, the second device with settings and configurations for local network devices. Method 400 may further include causing, by the first device, a service set identifier ("SSID") to be set up for a new network (block 416); receiving, by the first device and from the second device, one or more network access settings for accessing the new network (block 418); and accessing, by the first device, the new network, using the one or more network access settings (block 420).

In some embodiments, although not shown in FIG. 4A, method 400 may further include, after configuring the second device with settings and configurations of the previous local network device (at block 408) or after configuring the second device with settings and configurations for local network devices (at block 414), causing, by the first device, the second device to lock or disable subsequent modification of its settings and configurations.

In the non-limiting embodiment of FIG. 4B, the first device may refer to a not-yet-connected device (e.g., devices or user devices 150a-150n, 335a, 335b, 335c, 335d, and 335e of FIG. 1 or 3, or the like), while the second device may refer to a previously connected device (e.g., user device 105 or 305 of FIG. 1 or 3, or the like). Method 400, at block 402', may include causing, by the first device, a first barcode on the second device to be scanned using a first image-capture device, the first barcode including first data that is encoded therein. In some cases,—the first barcode may be displayed on a display device of the second device. At block 404', method 400 may include causing, by the first device, decoding of the first data that is encoded in the first barcode, the first data including first connectivity data associated with establishing secure wireless connection with the second device. Method 400 may further include causing, by the first device, a first secure wireless communications link to be established between the first device and the second device, based on the first connectivity data that is encoded in the first barcode (block 406').

At block 422, method 400 may include, after the first secure wireless communications link has been established, receiving, by the first device and from the second device, the second connectivity data for securely connecting with the local network device. Method 400 may further include causing, by the first device, a second secure wireless communications link to be established between the first device and the local network device, based on the second connectivity data that is received from the second device (block 424); receiving, by the first device and from the local network device, one or more network access settings for accessing the first network (block 426); and accessing, by the first device, the first network, using the one or more network access settings (block 428). In some examples, the first device may include, but is not limited to, one of a smart phone, a mobile phone, a tablet computer, a laptop computer, a desktop computer, a portable gaming device, or other user device with which the first image-capture device is at least one of an integrated or externally communicatively coupled, or the like.

In the non-limiting embodiment of FIG. 4C, the first device may refer to a previously connected device (e.g., user device 105 or 305 of FIG. 1 or 3, or the like), while the second device may refer to a not-yet-connected device (e.g., devices or user devices 150a-150n, 335a, 335b, 335c, 335d, and 335e of FIG. 1 or 3, or the like). Method 400, at block 402", may include causing, by the first device, a first barcode on the second device to be scanned using a first image-capture device, the first barcode including first data that is encoded therein. In some cases, the first barcode may be one of a static barcode that is affixed to a surface of the second device or a dynamic barcode that is displayed on a display device on the surface of the second device. At block 404", method 400 may include causing, by the first device, decoding of the first data that is encoded in the first barcode, the first data including first connectivity data associated with establishing secure wireless connection with the second device. Method 400 may further include causing, by the first device, a first secure wireless communications link to be established between the first device and the second device, based on the first connectivity data that is encoded in the first barcode (block 406").

Alternatively, in the case that both the first and second devices are capable of communicating using a secure wireless communications link based on one of IEEE 802.15 protocols ("Bluetooth protocols"), ISO/IEC 18092 protocols ("NFCIP-1 protocols"), ISO/IEC 21281 protocols ("NFCIP-2 protocols"), or ISO/IEC 14443 protocols ("RFID protocols"), method 400, at block 430, may include establishing a secure wireless communications link between the first device and the second device, based on the one of the Bluetooth protocols, the NFCIP-1 protocols, the NFCIP-2 protocols, or the RFID protocols.

At block 432, method 400 may include, after the secure wireless communications link (from block 406" or block 430) has been established, sending, by the first device and to the second device, the second connectivity data for securely connecting with the local network device. Method 400 may further include causing, by the second device, a second secure wireless communications link to be established between the second device and the local network device, based on the second connectivity data that is received from the first device (block 434); after the second secure wireless communications link has been established, receiving, by the second device and from the local network device, the one or more network access settings for accessing the first network (block 436); and accessing, by the second device, the first network (block 438). In some instances, the second device may include, without limitation, one of a smart phone, a mobile phone, a tablet computer, a laptop computer, a desktop computer, a portable gaming device, a home appliance, an office machine, a medical device, a commercial device, or an industrial device, or the like.

In the non-limiting embodiment of FIG. 4D, the first device may refer to a previously connected device (e.g., user device 105 or 305 of FIG. 1 or 3, or the like), while the second device may refer to a not-yet-connected device (e.g., devices or user devices 150a-150n, 335a, 335b, 335c, 335d, and 335e of FIG. 1 or 3, or the like). Method 400 may include causing, by the first device, secure communications to be established with a local network device. Method 400 either may continue onto the process at block 442 or may continue onto the process at block 450.

At block 442, method 400 may include causing, by the first device, the local network device to initiate a first temporary access mode, in which a temporary password may be generated. Method 400 may further include receiving and displaying, by the first device, the temporary password (block 444); receiving, by the second device, user input entering the temporary password for accessing the first network (block 446); and accessing, by the second device, the first network (block 448).

Alternatively, at block 450, method 400 may include causing, by the first device, the local network device to initiate a second temporary access mode, in which the local network device is configured to allow access to the first network in response to a trigger from the first device. Method 400 may further include receiving, by the first device, configuration information for triggering the local network device to allow access to the first network (block 452); generating and displaying, by the first device, a virtual Wi-Fi protected setup ("WPS") button (block 454); triggering temporary access to the first network in response to receiving user input depressing (or otherwise activating or actuating) the virtual WPS button (block 456); receiving, by the second device, user input indicating to connect to the first network during the temporary access period (i.e., the period triggered by the virtual WPS button being depressed, or the like) (block 458); and accessing, by the second device, the first network (block 448).

Referring to FIG. 4, in some cases, establishing one or more of the secure wireless communications links (at blocks 406, 406', 406", 424, 430, 434, and/or 440) may be performed based on a determined highest wireless encryption scheme that each device that is linked by the corresponding secure wireless communications link is capable of utilizing (e.g., WEP, WPA, WPA2, etc.). According to some embodiments, at least one of the first connectivity data or the second connectivity data may include, without limitation, at least one of a shared secret key, a network password, or a network passphrase, and/or the like. In some instances, the one or more network access settings may include, but are not limited to, at least one of a private Internet Protocol ("IP") subnet address, a gateway ID, a service set identifier ("SSID") for the first network, a media access control ("MAC") address for the local network device, or domain name system ("DNS") settings, and/or the like.

Exemplary System and Hardware Implementation

Figure 5:
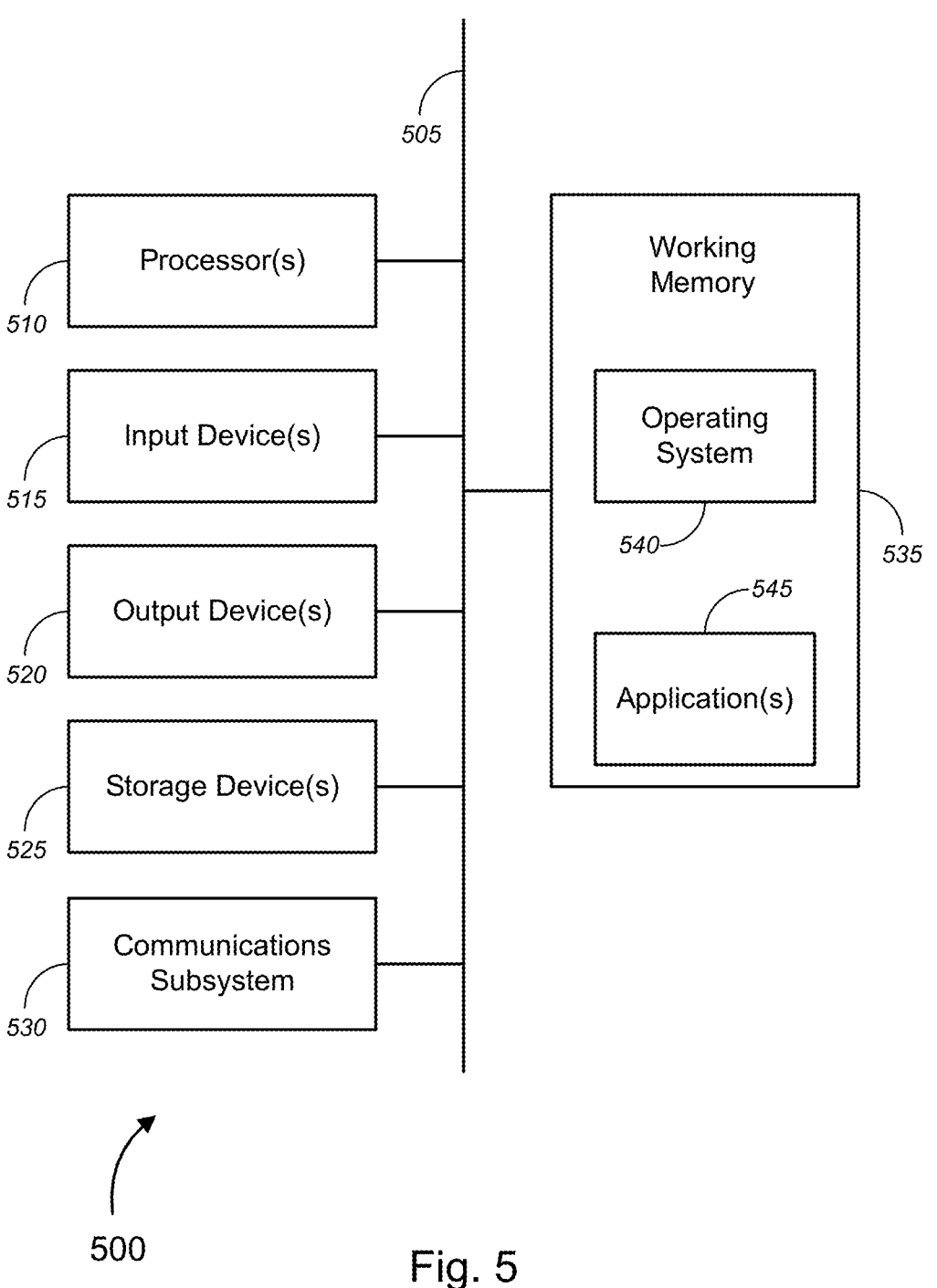
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., user devices 105 and 305, local network devices 110, 310a, 310b, and 310c, previous local network device 145, devices or user devices 150a-150n, 335a, 335b, 335c, 335d, and 335e, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., user devices 105 and 305, local network devices 110, 310a, 310b, and 310c, previous local network device 145, devices or user devices 150a-150n, 335a, 335b, 335c, 335d, and 335e, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   causing, by a first device, a first barcode on a second device to be scanned using a first image-capture device, the first barcode comprising first data that is encoded therein, wherein the first device comprises a previously connected user device, wherein the second device comprises a not-yet-connected user device, and wherein first barcode is one of a static barcode that is affixed to a surface of the second device or a dynamic barcode that is displayed on a display device on the surface of the second device;
   causing, by the first device, decoding of the first data that is encoded in the first barcode, the first data comprising first connectivity data associated with establishing secure wireless connection with the second device;
   causing, by the first device, a first secure wireless communications link to be established between the first device and the second device, based on the first connectivity data that is encoded in the first barcode;
   exchanging, over the first secure wireless communications link between the first and second devices, second data, the second data comprising one of one or more network access settings for accessing a first network that is established by a local network device or second connectivity data for connecting with a third device to obtain the one or more network access settings for accessing the first network, wherein exchanging the second data comprises sending, by the first device and to the second device, the second connectivity data for securely connecting with the local network device, the local network device being the third device;
   causing, by the second device, a second secure wireless communications link to be established between the second device and the local network device, based on the second connectivity data that is received from the first device;
receiving, by the second device, the one or more network access settings from the local network device; and
accessing, by one of the first device or the second device, the first network, using the one or more network access settings, wherein accessing the first network comprises accessing, by the second device, the first network, using the one or more network access settings.

2. The method of claim 1, wherein the first barcode comprises one of a one-dimensional ("1D") barcode or a two-dimensional ("2D") barcode.

3. The method of claim 1, wherein the local network device comprises one of a wireless access point ("WAP"), a modem, a router, a gateway device, or a device combining functionalities of two or more of the WAP, the modem, the router, or the gateway device.

4. The method of claim 3, wherein the first device comprises a user device, wherein the second device comprises the local network device, wherein the first barcode is one of a static barcode that is affixed to a surface of the local network device or a dynamic barcode that is displayed on a display device on the surface of the local network device, wherein the local network device is a replacement local network device that replaces a previous local network device, wherein the method further comprises:
   after the first secure wireless communications link has been established, configuring, by the first device, the second device with settings and configurations of the previous local network device;
   wherein exchanging the second data comprises, after the second device has established the first network based on the settings and configurations of the previous local network device, receiving, by the first device, the one or more network access settings from the second device; and
   wherein accessing the first network comprises accessing, by the first device, the first network, using the one or more network access settings.

5. The method of claim 4, wherein the user device comprises one of a smart phone, a mobile phone, a tablet computer, a laptop computer, a desktop computer, or a portable gaming device.

6. The method of claim 4, wherein the static barcode comprises a sticker-based barcode, wherein the dynamic barcode comprises a changeable barcode that is displayed on the display device that is one of affixed to or integrated with the surface of the local network device, wherein the display device comprises one of an electronic ink ("e-ink")-based display device, an electronic paper ("e-paper")-based display device, a liquid crystal display ("LCD") device, a light-emitting diode ("LED") display device, or an organic LED ("OLED") display device.

7. The method of claim 4, wherein the second device is configured to have a media access control ("MAC") address that is a clone of a MAC address of the previous local network device.

8. The method of claim 4, further comprising:
   after configuring the second device with settings and configurations of the previous local network device, causing, by the first device, the second device to lock or disable subsequent modification of its settings and configurations.

9. The method of claim 3, wherein the first device comprises a user device, wherein the second device comprises the local network device, wherein the first barcode is one of a static barcode that is affixed to a surface of the local network device or a dynamic barcode that is displayed on a display device on the surface of the local network device, wherein the method further comprises:

after the first secure wireless communications link has been established, configuring, by the first device, the second device with settings and configurations for the local network device;

causing, by the first device, a service set identifier ("SSID") to be set up for a new network, the new network being the first network;

wherein exchanging the second data comprises, after the second device has established the first network based on the settings and configurations for local network devices and with the SSID that is caused to be set up by the first device, receiving, by the first device, the one or more network access settings from the second device; and wherein accessing the first network comprises accessing, by the first device, the first network, using the one or more network access settings.

10. The method of claim 3, wherein the first device comprises a not-yet-connected user device, wherein the second device comprises a previously connected user device, wherein the first barcode is a barcode that is displayed on a display device of the second device, wherein the method further comprises:

after the first secure wireless communications link has been established, performing the step of exchanging the second data, wherein exchanging the second data comprises receiving, by the first device and from the second device, the second connectivity data for securely connecting with the local network device, the local network device being the third device;

causing, by the first device, a second secure wireless communications link to be established between the first device and the local network device, based on the second connectivity data that is received from the second device;

after the second secure wireless communications link has been established, receiving, by the first device, the one or more network access settings from the local network device; and wherein accessing the first network comprises accessing, by the first device, the first network, using the one or more network access settings.

11. The method of claim 10, wherein the first device comprises one of a smart phone, a mobile phone, a tablet computer, a laptop computer, a desktop computer, a portable gaming device, or other user device with which the first image-capture device is at least one of an integrated or externally communicatively coupled.

12. The method of claim 1, wherein the second device comprises one of a smart phone, a mobile phone, a tablet computer, a laptop computer, a desktop computer, a portable gaming device, a home appliance, an office machine, a medical device, a commercial device, or an industrial device.

13. The method of claim 1, wherein establishing one or both of the first secure wireless communications link or the second secure wireless communications link is performed based on a determined highest wireless encryption scheme that each device that is linked by the corresponding secure wireless communications link is capable of utilizing.

14. The method of claim 1, wherein at least one of the first connectivity data or the second connectivity data comprises at least one of a shared secret key, a network password, or a network passphrase, wherein the one or more network access settings comprise at least one of a private Internet Protocol ("IP") subnet address, a gateway ID, a service set identifier ("SSID") for the first network, a media access control ("MAC") address for the local network device, or domain name system ("DNS") settings.

15. A user device, comprising:

a first image-capture device, wherein the first image-capture device comprises a previously connected user device;

at least one first processor; and a first non-transitory computer readable medium communicatively coupled to the at least one first processor, the first non-transitory computer readable medium having stored thereon computer software comprising a first set of instructions that, when executed by the at least one first processor, causes the user device to:

scan a first barcode on a second device using the first image-capture device, the first barcode comprising first data that is encoded therein, wherein the second device comprises a not-yet-connected user device, and wherein the first barcode is one of a static barcode that is affixed to a surface of the second device or a dynamic barcode that is displayed on a display device on the surface of the second device;

decode the first data that is encoded in the first barcode, the first data comprising first connectivity data associated with establishing secure wireless connection with the second device;

establish a first secure wireless communications link between the user device and the second device, based on the first connectivity data that is encoded in the first barcode; and exchange, over the first secure wireless communications link, second data, the second data comprising one of one or more network access settings for accessing a first network that is established by a local network device or second connectivity data for connecting with a third device to obtain the one or more network access settings for accessing the first network, wherein the first network is accessed by one of the user device or the second device using the one or more network access settings, wherein exchanging the second data comprises sending, by the first device and to the second device, the second connectivity data for securely connecting with the local network device, the local network device being the third device, wherein the second device establishes a second secure wireless communications link between the second device and the local network device based on the second connectivity data that is received from the first device and receives the one or more network access settings from the local network device, and wherein accessing the first network comprises accessing, by the second device, the first network, using the one or more network access settings.

16. The user device of claim 15, wherein the second device comprises the local network device, wherein the first barcode is one of a static barcode that is affixed to a surface of the local network device or a dynamic barcode that is displayed on a display device on the surface of the local network device, wherein the first set of instructions, when executed by the at least one first processor, further causes the user device to perform one of:

in response to receiving user input to utilize settings and configurations of a previous local network device, performing the following:

after the first secure wireless communications link has been established, configuring the second device with settings and configurations of the previous local network device;

wherein exchanging the second data comprises, after the second device has established the first network based on the settings and configurations of the previous local network device, receiving the one or more network access settings from the second device; and wherein accessing the first network comprises accessing the first network, using the one or more network access settings; or in response to receiving user input to set up a new network, performing the following:

after the first secure wireless communications link has been established, configuring the second device with settings and configurations for local network devices;

setting up a service set identifier ("SSID") for a new network, the new network being the first network;

wherein exchanging the second data comprises, after the second device has established the first network based on the settings and configurations for local network devices and with the SSID that is caused to be set up by the first device, receiving the one or more network access settings from the second device; and wherein accessing the first network comprises accessing the first network, using the one or more network access settings.

17. The user device of claim 15, wherein the third device comprises the local network device, wherein the first set of instructions, when executed by the at least one first processor, further causes the user device to perform one of:

in response to receiving user input to provide access to the first network to the second device, which is a not-yet-connected device that does not have a camera but the first barcode is one of a static barcode that is affixed to a surface of the second device or a dynamic barcode that is displayed on a display device on the surface of the second devices, performing the following:

after the first secure wireless communications link has been established, performing the step of exchanging the second data, wherein exchanging the second data comprises sending, to the second device, the second connectivity data for securely connecting with the local network device, wherein the second device accesses the first network using the one or more network access settings that it receives from the local network device after establishing the second secure wireless communications link between the second device and the local network device, based on the second connectivity data that is received from the user device;

in response to receiving user input to provide access to the first network to a fourth device, which is a not-yet-connected device that has a camera, performing the following:

generating a second barcode on a display device for the fourth device to scan, the second barcode comprising third data that is encoded therein, the third data comprising third connectivity data associated with establishing secure wireless connection with the user device;

after a third secure wireless communications link has been established between the user device and the fourth device based on the third connectivity data that is encoded in the second barcode, sending, to the fourth device, fourth connectivity data for securely connecting with the local network device, wherein the fourth device accesses the first network using one or more second network access settings that it receives from the local network device after establishing a fourth secure wireless communications link between the fourth device and the local network device, based on the fourth connectivity data that is received from the user device;

in response to receiving user input to provide access to the first network to a fifth device, which is a not-yet-connected device that is capable of communicating using a secure wireless communications link based on one of IEEE 802.15 protocols ("Bluetooth protocols"), ISO/IEC 18092 protocols ("NFCIP-1 protocols"), ISO/IEC 21281 protocols ("NFCIP-2 protocols"), or ISO/IEC 14443 protocols ("RFID protocols"), performing the following:

establishing a fifth secure wireless communications link between the user device and the fifth device, based on the one of the Bluetooth protocols, the NFCIP-1 protocols, the NFCIP-2 protocols, or the RFID protocols;

after the fifth secure wireless communications link has been established between the user device and the fifth device, sending, to the fifth device, fifth connectivity data for securely connecting with the local network device, wherein the fifth device accesses the first network using one or more third network access settings that it receives from the local network device after establishing a sixth secure wireless communications link between the fifth device and the local network device, based on the fifth connectivity data that is received from the user device; or in response to receiving user input to provide access to the first network to a sixth device, which is a not-yet-connected device that is capable of communicating using a secure wireless communications link based on IEEE 802.11 protocols ("Wi-Fi protocols"), performing one of the following:

causing the local network device to initiate a first temporary access mode, which includes the local network device sending a temporary password to the user device; receiving and displaying the temporary password on a display device of the user device, wherein the sixth device accesses the first network using the temporary password that is displayed on the display device of the user device; or causing the local network device to initiate a second temporary access mode, which includes the local network device to enter into a discovery mode that ends either after connection with a responding device or after a preset delay period; wherein the sixth device accesses the first network by connecting with the local network device by initiating its own discovery mode during the discovery mode of the local network device.

\* \* \* \* \*